(12) United States Patent
Islam et al.

(10) Patent No.: US 10,853,055 B2
(45) Date of Patent: *Dec. 1, 2020

(54) SYSTEM AND METHOD FOR SUPPORTING PATCHING IN A MULTITENANT APPLICATION SERVER ENVIRONMENT

(71) Applicant: ORACLE INTERNATIONAL CORPORATION, Redwood Shores, CA (US)

(72) Inventors: Nazrul Islam, Santa Clara, CA (US); Jacob Lindholm, Londonderry, NH (US); Josh Dorr, San Jose, CA (US); Christopher Kasso, Los Altos, CA (US); Yamini K. Balasubramanyam, Bangalore (IN); Steven Liu, Beijing (CN); Rajiv Mordani, Sunnyvale, CA (US); Abhijit Kumar, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/398,887

(22) Filed: Apr. 30, 2019

(65) Prior Publication Data

US 2019/0258478 A1 Aug. 22, 2019

Related U.S. Application Data

(63) Continuation of application No. 15/466,267, filed on Mar. 22, 2017, now Pat. No. 10,318,280, which is a (Continued)

(51) Int. Cl.
*G06F 8/658* (2018.01)
*G06F 9/50* (2006.01)
(Continued)

(52) U.S. Cl.
CPC .............. *G06F 8/658* (2018.02); *G06F 8/65* (2013.01); *G06F 9/5077* (2013.01); *G06F 11/14* (2013.01)

(58) Field of Classification Search
None
See application file for complete search history.

(56) References Cited

U.S. PATENT DOCUMENTS 5,838,916 A 11/1998 Domenikos et al.
6,247,109 B1 6/2001 Kleinsorge et al.
(Continued)

FOREIGN PATENT DOCUMENTS

CN 101639835 2/2010
CN 102170457 8/2011
(Continued)

OTHER PUBLICATIONS

United States Patent and Trademark Office, Office Action dated Apr. 20, 2017 for U.S. Appl. No. 14/797,827, 17 Pages.
(Continued)

*Primary Examiner* — Qing Chen
(74) *Attorney, Agent, or Firm* — Tucker Ellis LLP

(57) ABSTRACT

In accordance with an embodiment, described herein is a system and method for supporting patching in a multi-tenant application server environment. The system can associate one or more partitions with a tenant, for use by that tenant, wherein a partition is a runtime and administrative subdivision or slice of a domain. A patching process can take advantage of high-availability features provided by an application server clustering environment, to apply patches in a controlled, rolling restart, which maintains a domain's ability to operate without interruption, or with zero downtime. The process can be used to automate complex or long running tasks, including preserving an unpatched or prior
(Continued)

version of an application server, application, or other software component for possible rollback, or providing automatic reversion in the event of an unrecoverable error.

18 Claims, 16 Drawing Sheets

Related U.S. Application Data continuation-in-part of application No. 15/098,839, filed on Apr. 14, 2016, now Pat. No. 9,916,153, which is a continuation of application No. 14/864,695, filed on Sep. 24, 2015, now Pat. No. 9,405,530.

(60) Provisional application No. 62/311,831, filed on Mar. 22, 2016, provisional application No. 62/054,903, filed on Sep. 24, 2014.

(51) Int. Cl.
*G06F 8/65* (2018.01)
*G06F 11/14* (2006.01)

(56) References Cited

U.S. PATENT DOCUMENTS

| | | |
|---|---|---|
| 6,542,926 B2 | 4/2003 | Zalewski et al. |
| 6,845,503 B1 | 1/2005 | Carlson et al. |
| 6,922,685 B2 | 7/2005 | Greene et al. |
| 6,931,638 B2 | 8/2005 | Daynes et al. |
| 6,980,980 B1 | 12/2005 | Yeh |
| 7,003,768 B2 | 2/2006 | Daynes et al. |
| 7,065,755 B2 | 6/2006 | Daynes et al. |
| 7,165,255 B2 | 1/2007 | Czajkowski et al. |
| 7,454,448 B1 | 11/2008 | Daynes et al. |
| 7,590,984 B2 | 9/2009 | Kaufman et al. |
| 7,627,621 B2 | 12/2009 | Daynes et al. |
| 7,725,559 B2 | 5/2010 | Landis et al. |
| 7,756,912 B2 | 7/2010 | Daynes et al. |
| 7,765,187 B2 | 7/2010 | Bergant et al. |
| 7,870,171 B2 | 1/2011 | Daynes et al. |
| 7,926,060 B2 | 4/2011 | Klingman |
| 8,078,704 B2 | 12/2011 | Lee |
| 8,166,152 B1 | 4/2012 | Delcheva et al. |
| 8,234,650 B1 | 7/2012 | Eppstein et al. |
| 8,250,559 B2 | 8/2012 | Daynes et al. |
| 8,402,525 B1 | 3/2013 | Shah et al. |
| 8,458,717 B1 | 6/2013 | Keagy et al. |
| 8,495,067 B2 | 7/2013 | Ripberger |
| 8,560,699 B1 | 10/2013 | Theimer et al. |
| 8,656,386 B1 | 2/2014 | Baimetov et al. |
| 8,671,404 B2 | 3/2014 | DeHaan et al. |
| 8,782,762 B2 | 7/2014 | Krishnan et al. |
| 8,813,225 B1 | 8/2014 | Fuller et al. |
| 8,839,426 B1 | 9/2014 | Brueckner et al. |
| 8,898,668 B1 | 11/2014 | Costea et al. |
| 8,959,523 B2 | 2/2015 | Patil et al. |
| 9,154,366 B1 | 10/2015 | Martin et al. |
| 9,325,585 B1 | 4/2016 | Wang et al. |
| 9,338,046 B2 | 5/2016 | Bose et al. |
| 9,696,985 B1 | 7/2017 | Gupta et al. |
| 10,055,219 B1 | 8/2018 | Olderdissen et al. |
| 2001/0047276 A1 | 11/2001 | Eisenhart |
| 2002/0002635 A1 | 1/2002 | Astala et al. |
| 2002/0066033 A1 | 5/2002 | Dobbins et al. |
| 2002/0087687 A1 | 7/2002 | Zaifman et al. |
| 2002/0184312 A1 | 12/2002 | Chen et al. |
| 2003/0074426 A1 | 4/2003 | Dervin et al. |
| 2003/0229623 A1 | 12/2003 | Chang et al. |
| 2004/0030627 A1 | 2/2004 | Sedukhin |
| 2004/0068560 A1 | 4/2004 | Oulu et al. |
| 2004/0194066 A1 | 9/2004 | Frey et al. |
| 2004/0215725 A1 | 10/2004 | Love et al. |
| 2005/0022006 A1 | 1/2005 | Bass et al. |
| 2005/0120160 A1 | 6/2005 | Plouffe et al. |
| 2005/0177827 A1 | 8/2005 | Fong et al. |
| 2005/0216585 A1 | 9/2005 | Todorova et al. |
| 2005/0216860 A1 | 9/2005 | Petrov et al. |
| 2005/0262507 A1 | 11/2005 | Langen et al. |
| 2005/0273456 A1 | 12/2005 | Revanuru et al. |
| 2005/0273667 A1 | 12/2005 | Shrivastava et al. |
| 2005/0273787 A1 | 12/2005 | Kovachka-Dimitrova et al. |
| 2005/0283658 A1 | 12/2005 | Clark et al. |
| 2006/0036448 A1 | 2/2006 | Haynie et al. |
| 2006/0106748 A1 | 5/2006 | Chafle et al. |
| 2006/0195818 A1 | 8/2006 | Berg et al. |
| 2006/0200800 A1 | 9/2006 | Melby |
| 2006/0206887 A1 | 9/2006 | Dodge et al. |
| 2007/0022203 A1 | 1/2007 | Haberkorn et al. |
| 2007/0044144 A1 | 2/2007 | Knouse et al. |
| 2007/0055781 A1 | 3/2007 | Fleischer et al. |
| 2007/0136278 A1 | 6/2007 | Grazioli et al. |
| 2007/0143299 A1 | 6/2007 | Huras et al. |
| 2007/0156808 A1 | 7/2007 | Koegel et al. |
| 2007/0156913 A1 | 7/2007 | Miyamoto et al. |
| 2007/0208862 A1 | 9/2007 | Fox et al. |
| 2007/0240127 A1 | 10/2007 | Rogues et al. |
| 2007/0282879 A1 | 12/2007 | Degenkolb et al. |
| 2008/0022380 A1 | 1/2008 | Lu et al. |
| 2008/0071922 A1 | 3/2008 | Chetuparambil et al. |
| 2008/0148254 A1 | 6/2008 | Hofer et al. |
| 2008/0165762 A1 | 7/2008 | Gilfix et al. |
| 2008/0177976 A1 | 7/2008 | Branda et al. |
| 2008/0301627 A1 | 12/2008 | Stark |
| 2008/0320269 A1 | 12/2008 | Houlihan et al. |
| 2009/0019439 A1 | 1/2009 | Kwon et al. |
| 2009/0024851 A1 | 1/2009 | Jain et al. |
| 2009/0094073 A1 | 4/2009 | Cheung et al. |
| 2009/0116380 A1 | 5/2009 | Santiago et al. |
| 2009/0118839 A1 | 5/2009 | Accapadi et al. |
| 2009/0125612 A1 | 5/2009 | Rabetge et al. |
| 2009/0144720 A1 | 6/2009 | Roush et al. |
| 2009/0183168 A1 | 7/2009 | Uchida |
| 2009/0187899 A1 | 7/2009 | Mani et al. |
| 2009/0241100 A1 | 9/2009 | Sakurai et al. |
| 2009/0259999 A1 | 10/2009 | Srinivasan |
| 2009/0271696 A1 | 10/2009 | Bailor et al. |
| 2009/0276771 A1 | 11/2009 | Nickolov et al. |
| 2009/0276783 A1 | 11/2009 | Johnson et al. |
| 2009/0300093 A1 | 12/2009 | Griffiths et al. |
| 2009/0307743 A1 | 12/2009 | Azagury et al. |
| 2009/0320045 A1 | 12/2009 | Griffith et al. |
| 2010/0017794 A1 | 1/2010 | Waters et al. |
| 2010/0023937 A1 | 1/2010 | Kothari et al. |
| 2010/0138696 A1 | 6/2010 | Dehaan et al. |
| 2010/0162226 A1 | 6/2010 | Borissov et al. |
| 2010/0176962 A1 | 7/2010 | Yossef |
| 2010/0191843 A1 | 7/2010 | Bohm |
| 2010/0251002 A1 | 9/2010 | Sivasubramanian et al. |
| 2010/0274910 A1 | 10/2010 | Ghanaie-Sichanie et al. |
| 2010/0325624 A1 | 12/2010 | Bartolo et al. |
| 2011/0022694 A1 | 1/2011 | Dalal et al. |
| 2011/0125979 A1 | 5/2011 | Kancharla et al. |
| 2011/0137953 A1 | 6/2011 | Bobick et al. |
| 2011/0138374 A1 | 6/2011 | Pal |
| 2011/0145794 A1 | 6/2011 | Gerginov et al. |
| 2011/0161949 A1 | 6/2011 | Kodaka |
| 2011/0185064 A1 | 7/2011 | Head et al. |
| 2011/0213870 A1 | 9/2011 | Cai et al. |
| 2011/0265168 A1 | 10/2011 | Lucovsky et al. |
| 2011/0320520 A1 | 12/2011 | Jain |
| 2011/0321031 A1 | 12/2011 | Dournov et al. |
| 2012/0047239 A1 | 2/2012 | Donahue et al. |
| 2012/0054732 A1 | 3/2012 | Jain et al. |
| 2012/0072597 A1 | 3/2012 | Teather et al. |
| 2012/0096521 A1 | 4/2012 | Peddada |
| 2012/0102480 A1 | 4/2012 | Hopmann et al. |
| 2012/0110566 A1 | 5/2012 | Park |
| 2012/0110574 A1 | 5/2012 | Kumar |
| 2012/0124353 A1 | 5/2012 | Rehman |
| 2012/0131101 A1 | 5/2012 | Said et al. |
| 2012/0144044 A1 | 6/2012 | Verma |
| 2012/0147894 A1 | 6/2012 | Mulligan et al. |

(56) References Cited

U.S. PATENT DOCUMENTS

| | | |
|---|---|---|
| 2012/0150912 A1 | 6/2012 | Ripberger |
| 2012/0167081 A1 | 6/2012 | Sedayao et al. |
| 2012/0179646 A1 | 7/2012 | Hinton et al. |
| 2012/0215775 A1 | 8/2012 | Allen et al. |
| 2012/0221697 A1 | 8/2012 | Darcy |
| 2012/0227116 A1 | 9/2012 | Huang et al. |
| 2012/0239730 A1 | 9/2012 | Revanuru et al. |
| 2012/0254266 A1 | 10/2012 | Printezis et al. |
| 2012/0254331 A1 | 10/2012 | Chuan et al. |
| 2012/0254445 A1 | 10/2012 | Kawamoto et al. |
| 2013/0007891 A1 | 1/2013 | Mogaki |
| 2013/0031403 A1 | 1/2013 | Mordani et al. |
| 2013/0036400 A1 | 2/2013 | Bak et al. |
| 2013/0067493 A1 | 3/2013 | Dion et al. |
| 2013/0086235 A1 | 4/2013 | Ferris |
| 2013/0103639 A1 | 4/2013 | Greenberg et al. |
| 2013/0117289 A1 | 5/2013 | Fischer et al. |
| 2013/0132458 A1 | 5/2013 | Little |
| 2013/0151683 A1 | 6/2013 | Jain et al. |
| 2013/0160115 A1 | 6/2013 | Venkataramanappa et al. |
| 2013/0212279 A1 | 8/2013 | Dutta et al. |
| 2013/0212576 A1 | 8/2013 | Huang et al. |
| 2013/0226985 A1 | 8/2013 | Dixon et al. |
| 2013/0232191 A1 | 9/2013 | Cheng et al. |
| 2013/0232498 A1 | 9/2013 | Mangtani et al. |
| 2013/0262689 A1 | 10/2013 | Schmidt et al. |
| 2013/0268920 A1 | 10/2013 | Ursal et al. |
| 2013/0275819 A1 | 10/2013 | Banerjee et al. |
| 2013/0275976 A1 | 10/2013 | Dawson et al. |
| 2013/0304788 A1 | 11/2013 | DeLuca et al. |
| 2013/0326494 A1 | 12/2013 | Nunez |
| 2013/0326506 A1 | 12/2013 | McGrath et al. |
| 2013/0326507 A1 | 12/2013 | McGrath et al. |
| 2013/0332577 A1 | 12/2013 | Nakil et al. |
| 2013/0339400 A1 | 12/2013 | Pflughoeft |
| 2014/0006626 A1 | 1/2014 | Breiter et al. |
| 2014/0013325 A1 | 1/2014 | Shimoni et al. |
| 2014/0033268 A1 | 1/2014 | Julisch et al. |
| 2014/0047439 A1 | 2/2014 | Levy et al. |
| 2014/0068207 A1 | 3/2014 | Aslot et al. |
| 2014/0075019 A1 | 3/2014 | Mordani et al. |
| 2014/0075021 A1 | 3/2014 | Revanuru |
| 2014/0075030 A1 | 3/2014 | Wang et al. |
| 2014/0075520 A1 | 3/2014 | Subramanian et al. |
| 2014/0082470 A1 | 3/2014 | Trebas et al. |
| 2014/0089928 A1 | 3/2014 | Stern et al. |
| 2014/0101644 A1 | 4/2014 | Buzaski et al. |
| 2014/0123316 A1 | 5/2014 | Leggette et al. |
| 2014/0136688 A1 | 5/2014 | Kopri et al. |
| 2014/0149980 A1 | 5/2014 | Vittal et al. |
| 2014/0149983 A1 | 5/2014 | Bonilla et al. |
| 2014/0173566 A1 | 6/2014 | Hsu et al. |
| 2014/0189681 A1 | 7/2014 | Bryan et al. |
| 2014/0244585 A1 | 8/2014 | Sivasubramanian et al. |
| 2014/0278641 A1 | 9/2014 | Kleehammer et al. |
| 2014/0280306 A1 | 9/2014 | Juillard |
| 2014/0280595 A1 | 9/2014 | Mani et al. |
| 2014/0280975 A1 | 9/2014 | Mordani et al. |
| 2014/0297868 A1 | 10/2014 | Ennaji et al. |
| 2014/0310287 A1 | 10/2014 | Bruso et al. |
| 2014/0331297 A1 | 11/2014 | Innes et al. |
| 2014/0344337 A1 | 11/2014 | Sramka et al. |
| 2014/0344395 A1 | 11/2014 | Alexander |
| 2014/0359126 A1 | 12/2014 | Breternitz et al. |
| 2014/0359552 A1 | 12/2014 | Misra et al. |
| 2015/0006650 A1 | 1/2015 | Basavanna et al. |
| 2015/0096011 A1 | 4/2015 | Watt |
| 2015/0106521 A1 | 4/2015 | Cao et al. |
| 2015/0095917 A1 | 5/2015 | Challenger et al. |
| 2015/0207758 A1 | 7/2015 | Mordani et al. |
| 2015/0296030 A1 | 10/2015 | Maes et al. |
| 2015/0370549 A1 | 12/2015 | Zhang et al. |
| 2015/0370608 A1 | 12/2015 | DiPol et al. |
| 2016/0020965 A1 | 1/2016 | Sakata et al. |
| 2016/0057041 A1 | 2/2016 | Gupta et al. |
| 2016/0085543 A1 | 3/2016 | Islam et al. |
| 2016/0092197 A1 | 3/2016 | Kuchibhotla et al. |
| 2016/0092278 A1 | 3/2016 | Quinn et al. |
| 2016/0092342 A1 | 3/2016 | Inamdar et al. |
| 2016/0094583 A1 | 3/2016 | Bower |
| 2016/0094625 A1 | 3/2016 | Sengodan et al. |
| 2016/0094647 A1 | 3/2016 | Mordani et al. |
| 2016/0231998 A1 | 8/2016 | Islam et al. |
| 2016/0285694 A1 | 9/2016 | Maes |
| 2016/0378453 A1 | 12/2016 | Kalidindi et al. |
| 2017/0019485 A1 | 1/2017 | Dorr et al. |
| 2017/0142228 A1 | 5/2017 | Byrne et al. |
| 2017/0222910 A1 | 8/2017 | Cai et al. |
| 2018/0026849 A1 | 1/2018 | Guim Bernat et al. |
| 2018/0181439 A1 | 6/2018 | Jackson et al. |

FOREIGN PATENT DOCUMENTS

| | | |
|---|---|---|
| CN | 102333115 | 1/2012 |
| CN | 102571821 | 7/2012 |
| CN | 102571916 | 7/2012 |
| CN | 102609271 | 7/2012 |
| CN | 102932404 | 2/2013 |
| CN | 102932405 | 2/2013 |
| CN | 103124967 | 5/2013 |
| CN | 103365683 | 10/2013 |
| CN | 103455512 | 12/2013 |
| GB | 2510874 | 8/2014 |
| JP | H03-097030 | 4/1991 |
| JP | 2004-102379 | 4/2004 |
| JP | 2005092803 | 4/2005 |
| JP | 2011257847 | 12/2011 |
| JP | 2012527027 | 11/2012 |
| WO | 0078004 | 12/2000 |
| WO | 2006040810 | 4/2006 |
| WO | 2011162991 | 12/2011 |
| WO | 2012054160 | 4/2012 |
| WO | 2013138774 | 9/2013 |
| WO | 2014007813 | 1/2014 |
| WO | 2014039892 | 3/2014 |
| WO | 2014039918 | 3/2014 |
| WO | 2014039919 | 3/2014 |
| WO | 2016049376 | 3/2016 |

OTHER PUBLICATIONS

United States Patent and Trademark Office, Office Action dated Apr. 27, 2017 for U.S. Appl. No. 14/748,094, 12 Pages.
United States Patent and Trademark Office, Office Action dated Apr. 28, 2017 for U.S. Appl. No. 14/748,011, 25 Pages.
United States Patent and Trademark Office, Office Action dated May 19, 2017 for U.S. Appl. No. 14/747,826, 15 Pages.
United States Patent and Trademark Office, Office Action dated Jun. 8, 2017 for U.S. Appl. No. 14/865,733, 8 Pages.
United States Patent and Trademark Office, Office Action dated Jun. 14, 2017 for U.S. Appl. No. 14/864,719, 7 Pages.
United States Patent and Trademark Office, Office Action dated Jun. 15, 2017 for U.S. Appl. No. 14/864,708, 7 Pages.
United States Patent and Trademark Office, Office Action dated Jun. 23, 2017 for U.S. Appl. No. 14/799,273, 14 Pages.
United States Patent and Trademark Office, Office Action dated Jun. 29, 2017 for U.S. Appl. No. 14/865,748, 11 Pages.
United States Patent and Trademark Office, Office Action dated Jun. 30, 2017 for U.S. Appl. No. 14/864,725, 8 Pages.
United States Patent and Trademark Office, Notice of Allowance dated Jul. 10, 2017 for U.S. Appl. No. 15/059,193, 14 Pages.
United States Patent and Trademark Office, Notice of Allowance dated Jul. 11, 2017 for U.S. Appl. No. 15/059,872, 13 Pages.
United States Patent and Trademark Office, Office Action dated Jul. 13, 2017 for U.S. Appl. No. 14/860,348, 8 Pages.
United States Patent and Trademark Office, Office Action dated Jul. 20, 2017 for U.S. Appl. No. 14/860,513, 9 Pages.
United States Patent and Trademark Office, Office Action dated Jul. 27, 2017 for U.S. Appl. No. 14/748,102, 12 Pages.
United States Patent and Trademark Office, Office Action dated Jul. 28, 2017 for U.S. Appl. No. 14/863,245, 27 Pages.

(56) References Cited

OTHER PUBLICATIONS

United States Patent and Trademark Office, Office Action dated Jul. 28, 2017 for U.S. Appl. No. 14/866,601, 10 Pages.
United States Patent and Trademark Office, Office Action dated Mar. 16, 2018 for U.S. Appl. No. 15/204,351, 16 Pages.
Chinese Patent Office, Office Action dated Jul. 20, 2018 for Application No. 201580003512.6, 8 pages.
United States Patent and Trademark Office, Notice of Allowance dated Aug. 30, 2018 for U.S. Appl. No. 15/204,351, 15 Pages.
United States Patent and Trademark Office, Office Action dated Nov. 2, 2018 for U.S. Appl. No. 15/706,233, 25 Pages.
United States Patent and Trademark Office, Notice of Allowance dated Jan. 24, 2019 or U.S. Appl. No. 15/706,241, 19 Pages.
United States Patent and Trademark Office, Notice of Allowance dated Apr. 10, 2019 for U.S. Appl. No. 15/890,601, 20 Pages.
Communication pursuant to Article 94(3) EPC, dated Apr. 23, 2019 for EP Application No. 15704133.6, 4 pages.
Communication pursuant to Article 94(3) EPC, dated Jun. 12, 2019 for EP Application No. 15778471.1, 8 pages.
United States Patent and Trademark Office, Office Action dated Aug. 9, 2019 for U.S. Appl. No. 15/948,721, 18 pages.
Japanese Office Action dated Aug. 27, 2019 for Japanese Patent Application No. 2017-516114, 5 dated
Shimamura, et al., "Research Developments that serve a future underlying cloud technology", NEC Technical Journal, NEC Corporation, Apr. 23, 2010, vol. 63, No. 2, pp. 114-118, 6 pages.
Indian Patent Office, First Examination Report dated Jun. 9, 2020 for Indian Patent Application No. 201747014026, 6 pages.
Chinese Patent Office, Office Action for Chinese Application No. 201580051272.7, dated May 23, 2019, 10 pages.
United States Patent and Trademark Office, Office Action dated Jun. 14, 2019 for U.S. Appl. No. 16/028,700, 13 Pages.
Barreiros, et al. "A Cover-Based Approach for Configuration Repair", ACM 2014, pp. 157-166, 10 pages.
Cisco, "Designing Secure Multi-Tenancy into Virtualized Data Centers", Cisco Systems, Inc., Dec. 7, 2009, 82 pages.
Coward, et al. "Java TM Servlet Specification Version 24", Nov. 24, 2003, 330 pages.
Czajkowski, et al. "Multitasking without Compromise: a Virtual Machine Evolution", 2001, 14 pages.
D'Ambrosio, et al. "Configuration-Level Hardware/Software Partitioning for Real-Time Embedded Systems", pp. 34-41, 8 pages.
Elmore, et al. "Zephyr: Live Migration in Shared Nothing Databases for Elastic Cloud Platforms", Jun. 2011, 12 pages.
Gil, David, "What's New in WebLogic 12c", published Jun. 12, 2014, https://www.slideshare.net/OracleMKTPR20/novedades-de-weblogic-12cdavid-sanz, Oracle, 41 pages.
Kang, et al. "MultiLanes: Providing Virtualized Storage for OS-level Virtualization on Many Cores", 12th USENIX Conference on File and Storage Technologies, Feb. 2014, 14 pages.
Leibert, et al. "Automatic Management of Partitioned, Replicated Search Services", Oct. 2011, 8 pages.
Oracle, "Introducing WebLogic Server 12c", an Oracle White Paper, Jan. 2012, 17 pages.
Oracle, "Oracle Enterprise Manager: Concepts", 11g Release 11.1.0.1, Apr. 2010, 260 pages.
Periasamy, "Performance Optimization in Cloud Computing Environment", India Software Lab, IBM, Bangalore, India, 6 pages.
Porter, et al. "Partition Configuration for Real-Time Systems with Dependencies", Oct. 2013, 10 pages.
Sorensen, et al. "Reuse and Combination with Package Templates", 2010, 5 pages.
Sun Microsystems, Inc., "Java Naming and Directory Interface Application Programming Interface (JNDI API)", Jul. 14, 1999, 76 pages.
Tatsubori, et al. "HTML Templates that Fly: A Template Engine Approach to Automated Offloading from Server to Client", Apr. 2009, pp. 951-960, 10 pages.

International Search Report and the Written Opinion of the International Searching Authority for PCT Application No. PCT/US2015/012268, dated Apr. 24, 2015, 10 pages.
International Search Report and the Written Opinion of the International Searching Authority for PCT Application No. PCT/US2015/037270, dated Sep. 23, 2015, 9 pages.
International Search Report and the Written Opinion of the International Searching Authority for PCT Application No. PCT/US2015/037264, dated Sep. 24, 2015, 11 pages.
International Search Report and the Written Opinion of the International Searching Authority for PCT Application No. PCT/US2015/037265, dated Sep. 24, 2015, 10 pages.
International Search Report and the Written Opinion of the International Searching Authority for PCT Application No. PCT/US2015/037267, dated Sep. 24, 2015, 13 pages.
International Search Report and the Written Opinion of the International Searching Authority for PCT Application No. PCT/US2015/037403, dated Sep. 28, 2015, 12 pages.
International Search Report and the Written Opinion of the International Searching Authority for PCT Application No. PCT/US2015/040407, dated Sep. 28, 2015, 10 pages.
International Search Report and the Written Opinion of the International Searching Authority for PCT Application No. PCT/US2015/037262, dated Oct. 15, 2015, 13 pages.
International Search Report and the Written Opinion of the International Searching Authority for PCT Application No. PCT/US2015/040048, dated Oct. 15, 2015, 12 pages.
United States Patent and Trademark Office, Office Action dated Dec. 1, 2015 for U.S. Appl. No. 14/864,695, 28 Pages.
International Search Report and the Written Opinion of the International Searching Authority for PCT Application No. PCT/US2015/052057, dated Dec. 8, 2015, 13 pages.
International Search Report and the Written Opinion of the International Searching Authority for PCT Application No. PCT/US2015/052471, dated Dec. 14, 2015, 11 pages.
International Search Report and the Written Opinion of the International Searching Authority for PCT Application No. PCT/US2015/052459, dated Jan. 4, 2016, 13 pages.
International Search Report and the Written Opinion of the International Searching Authority for PCT Application No. PCT/US2015/052462, dated Jan. 5, 2016, 14 pages.
International Search Report and the Written Opinion of the International Searching Authority for PCT Application No. PCT/US2015/052469, dated Jan. 19, 2016, 14 pages.
United States Patent and Trademark Office, Third-Party Submission Under 37 CFR 1.290 Concise Description of Relevance dated Apr. 22, 2016 for U.S. Appl. No. 14/866,644, 9 Pages.
United States Patent and Trademark Office, Office Action dated Jul. 5, 2016 for U.S. Appl. No. 14/748,142, 12 Pages.
United States Patent and Trademark Office, Office Action dated Aug. 25, 2016 for U.S. Appl. No. 14/747,718, 28 Pages.
United States Patent and Trademark Office, Office Action dated Aug. 26, 2016 for U.S. Appl. No. 14/860,348, 7 Pages.
United States Patent and Trademark Office, Office Action dated Oct. 5, 2016 for U.S. Appl. No. 14/865,896, 11 Pages.
United States Patent and Trademark Office, Notice of Allowance dated Oct. 11, 2016 =for U.S. Appl. No. 14/747,778, 21 Pages.
International Search Report and the Written Opinion of the International Searching Authority for PCT Application No. PCT/US2016/051099, dated Nov. 29, 2016, 12 pages.
United States Patent and Trademark Office, Office Action dated Dec. 16, 2016 for U.S. Appl. No. 14/747,148, 12 Pages.
United States Patent and Trademark Office, Office Action dated Dec. 22, 2016 for U.S. Appl. No. 14/866,591, 12 Pages.
United States Patent and Trademark Office, Office Action dated Dec. 30, 2016 for U.S. Appl. No. 14/860,348, 9 Pages.
United States Patent and Trademark Office, Office Action dated Jan. 23, 2017 for U.S. Appl. No. 14/748,146, 12 Pages.
United States Patent and Trademark Office, Office Action dated Feb. 2, 2017 for U.S. Appl. No. 14/747,718, 31 Pages.
United States Patent and Trademark Office, Office Action dated Feb. 17, 2017 for U.S. Appl. No. 14/866,644, 12 Pages.

(56) References Cited

OTHER PUBLICATIONS

United States Patent and Trademark Office, Office Action dated Feb. 23, 2017 for U.S. Appl. No. 14/747,982, 11 Pages.
United States Patent and Trademark Office, Notice of Allowance dated Mar. 1, 2017 for U.S. Appl. No. 14/748,142, 17 Pages.
United States Patent and Trademark Office, Office Action dated Mar. 10, 2017 for U.S. Appl. No. 14/747,866, 21 Pages.
United States Patent and Trademark Office, Office Action dated Mar. 24, 2017 for U.S. Appl. No. 14/747,853, 22 Pages.
International Preliminary Report on Patentability and Written Opinion of the International Searching Authority for PCT Application No. PCT/US2015/052057, dated Mar. 28, 2017, 8 pages.
United States Patent and Trademark Office, Office Action dated Apr. 19, 2017 for U.S. Appl. No. 14/747,675, 15 Pages.
Chikara Sase, Complete Manual of RAC System Construction to Maximize Introduction Effects, DB Magazine Aug. 2005, Shoeisha Co., Ltd., Aug. 1, 2005, vol. 15, Issue 4, pp. 93-105, 14 pages.
United States Patent and Trademark Office, Notice of Allowance dated Dec. 16, 2019 for U.S. Appl. No. 15/948,721, 18 pages.
Japanese Patent Office, Office Action dated Mar. 10, 2020 for Japanese Patent Application No. 2017-516114, 6 pages.
United States Patent and Trademark Office, Office Action dated Mar. 17, 2020 for U.S. Appl. No. 16/028,700, 15 pages.
United States Patent and Trademark Office, Notice of Allowance dated Mar. 27, 2020 for U.S. Appl. No. 15/948,721, 18 pages.
Indian Patent Office, First Examination Report dated Jun. 22, 2020 for Indian Patent Application No. 201647017709, 6 pages.
United States Patent and Trademark Office, Notice of Allowance dated Jul. 27, 2020 for U.S. Appl. No. 16/525,212, 20 pages.

SYSTEM AND METHOD FOR SUPPORTING PATCHING IN A MULTITENANT APPLICATION SERVER ENVIRONMENT

CLAIM OF PRIORITY AND CROSS-REFERENCE TO RELATED APPLICATIONS

This application is a continuation of U.S. Patent Application titled "SYSTEM AND METHOD FOR SUPPORTING PATCHING IN A MULTITENANT APPLICATION SERVER ENVIRONMENT", application Ser. No. 15/466,267, filed Mar. 22, 2017 and subsequently issued as U.S. Pat. No. 10,318,280 on Jun. 11, 2019, which is a continuation-in-part of U.S. Patent Application titled "SYSTEM AND METHOD FOR SUPPORTING PATCHING IN A MULTI-TENANT APPLICATION SERVER ENVIRONMENT", application Ser. No. 15/098,839, filed Apr. 14, 2016 and subsequently issued as U.S. Pat. No. 9,916,153 on Mar. 13, 2018, which is a continuation of U.S. Patent Application titled "SYSTEM AND METHOD FOR SUPPORTING PATCHING IN A MULTITENANT APPLICATION SERVER ENVIRONMENT", application Ser. No. 14/864,695, filed Sep. 24, 2015 and subsequently issued as U.S. Pat. No. 9,405,530 on Aug. 2, 2016, which claims the benefit of priority to U.S. Provisional Application titled "SYSTEM AND METHOD FOR MULTITENANT-AWARE PATCHING IN A MULTITENANT APPLICATION SERVER ENVIRONMENT", Application No. 62/054,903, filed Sep. 24, 2014; which application also claims the benefit of priority to U.S. Provisional Application titled "SYSTEM AND METHOD FOR SUPPORTING PATCHING IN A MULTITENANT APPLICATION SERVER ENVIRONMENT", Application No. 62/311,831, filed Mar. 22, 2016; and is related to U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015 and subsequently issued as U.S. Pat. No. 9,961,011 on May 1, 2018; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud platform environments, and are particularly related to a system and method for supporting patching in a multitenant application server environment.

BACKGROUND

In application server and other enterprise computing environments, a common task for an administrator is the need to patch a series of application server installations supporting multiple domains. A patch may include a one-off fix for a specific problems, or a periodic version update.

Regardless of why the patch needs to be installed, the administrator must generally perform a complex series of steps on each node of the domain in order to rollout the patch while minimizing application downtime, including ensuring the patching environment is up to date on each host; shutting down those servers running on the host; and then patching and restarting the application server instances and verifying the patch works correctly. Since patching is a complex process, and even for a single application server instance can take many minutes, which can become hours when a patch is applied to all nodes in a domain, the process can create anxiety for users who risk the possibility of system downtime.

SUMMARY

In accordance with an embodiment, described herein is a system and method for supporting patching in a multi-tenant application server environment. The system can associate one or more partitions with a tenant, for use by that tenant, wherein a partition is a runtime and administrative subdivision or slice of a domain. A patching process can take advantage of high-availability features provided by an application server clustering environment, to apply patches in a controlled, rolling restart, which maintains a domain's ability to operate without interruption, or with zero downtime. The process can be used to automate complex or long running tasks, including preserving an unpatched or prior version of an application server, application, or other software component for possible rollback, or providing automatic reversion in the event of an unrecoverable error.

DETAILED DESCRIPTION

In accordance with an embodiment, described herein is a system and method for supporting patching in a multi-tenant application server environment. The system can associate one or more partitions with a tenant, for use by that tenant, wherein a partition is a runtime and administrative subdivision or slice of a domain. A patching process can take advantage of high-availability features provided by an application server clustering environment, to apply patches in a controlled, rolling restart, which maintains a domain's ability to operate without interruption, or with zero downtime. The process can be used to automate complex or long running tasks, including preserving an unpatched or prior version of an application server, application, or other software component for possible rollback, or providing automatic reversion in the event of an unrecoverable error.

Application Server (e.g., Multi-Tenant, MT) Environment

Figure 1:
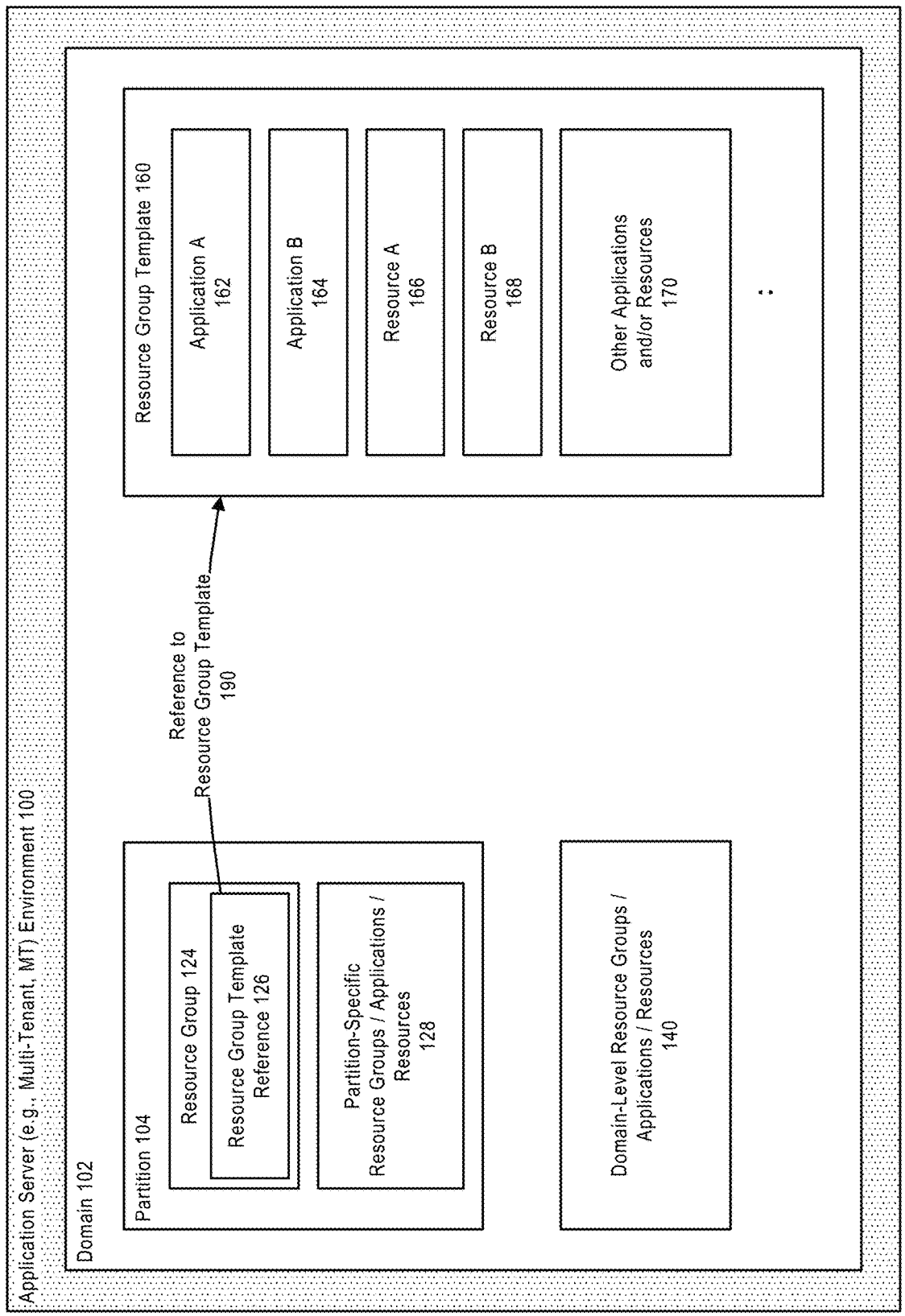
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
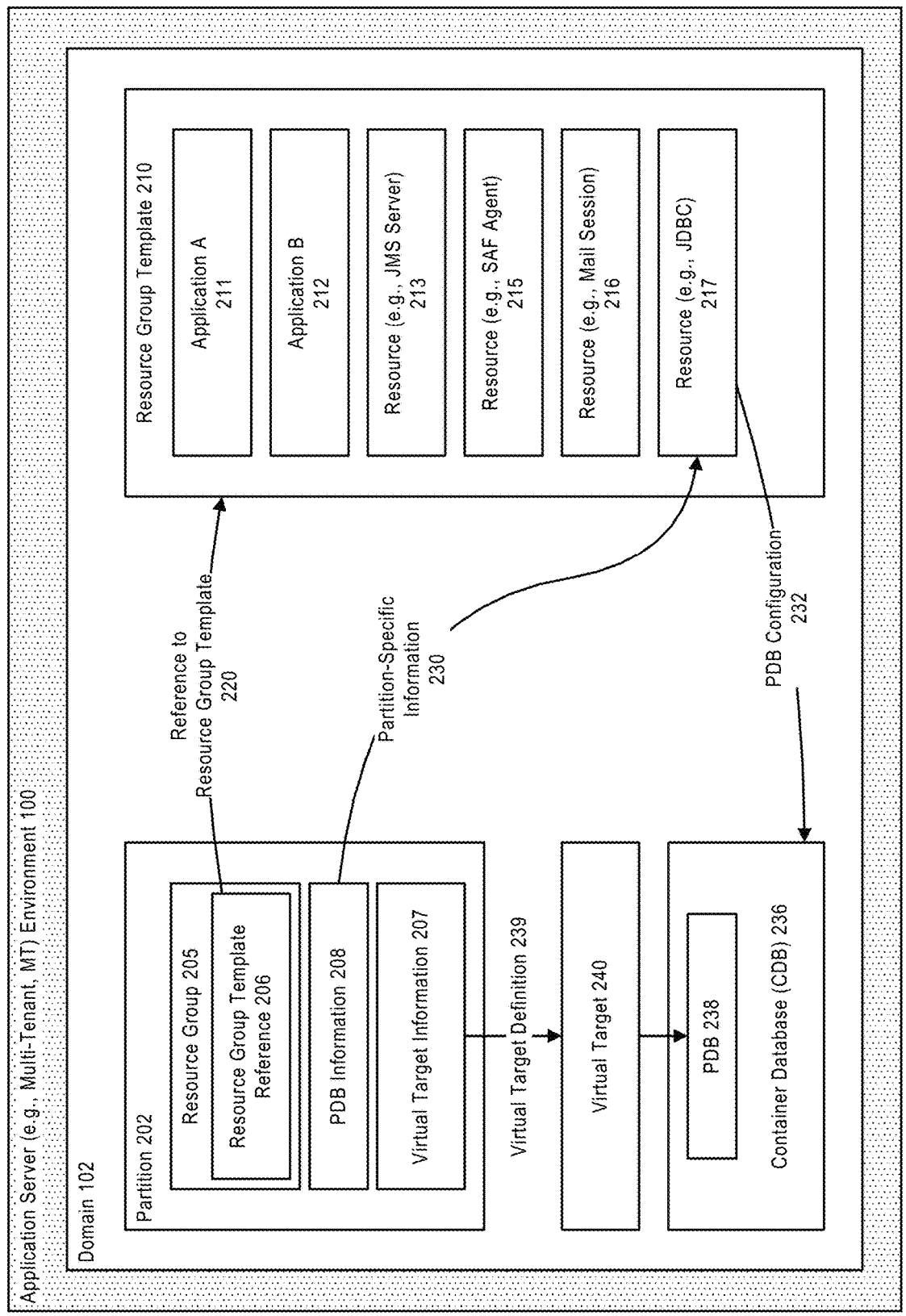
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
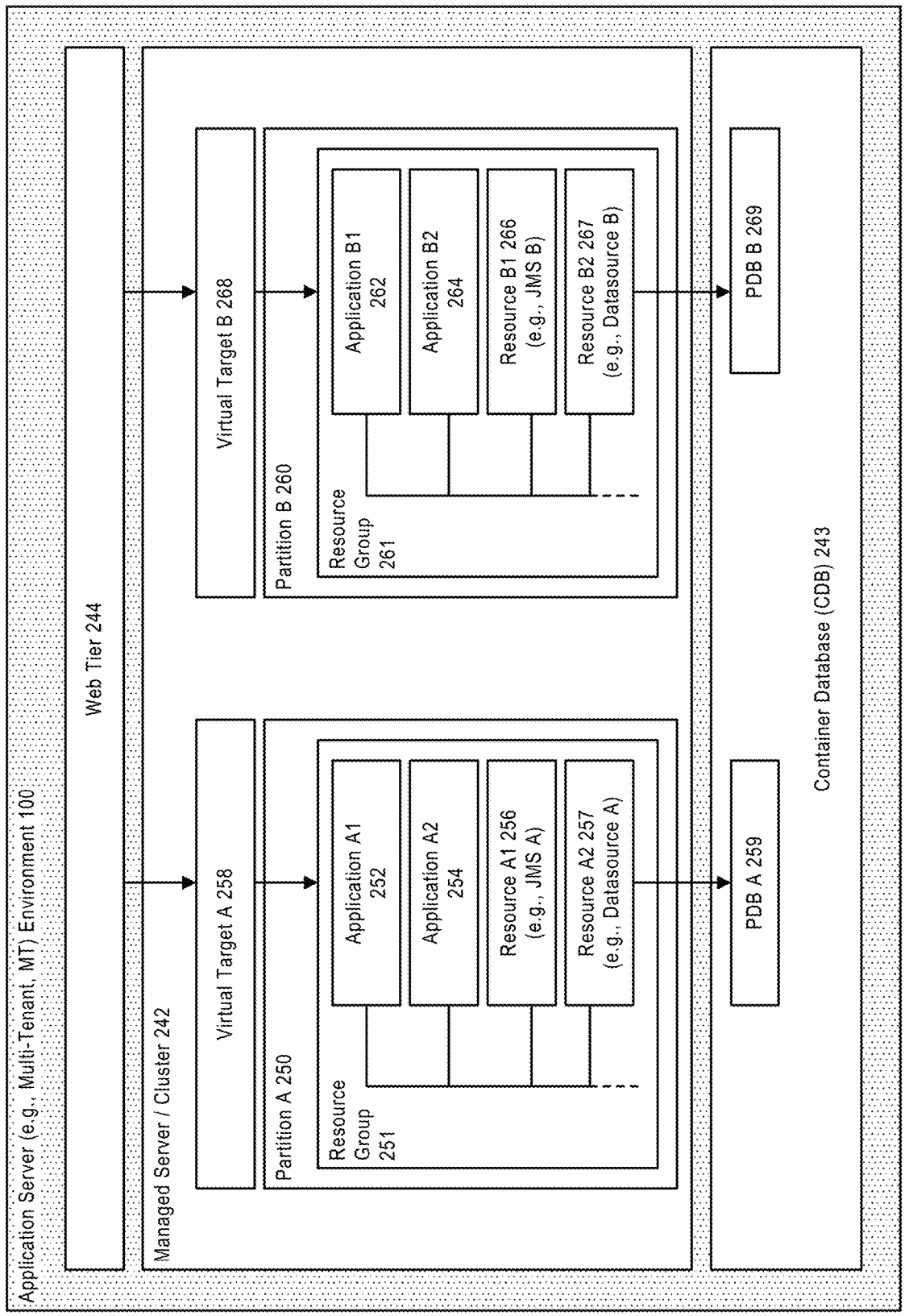
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRM DataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
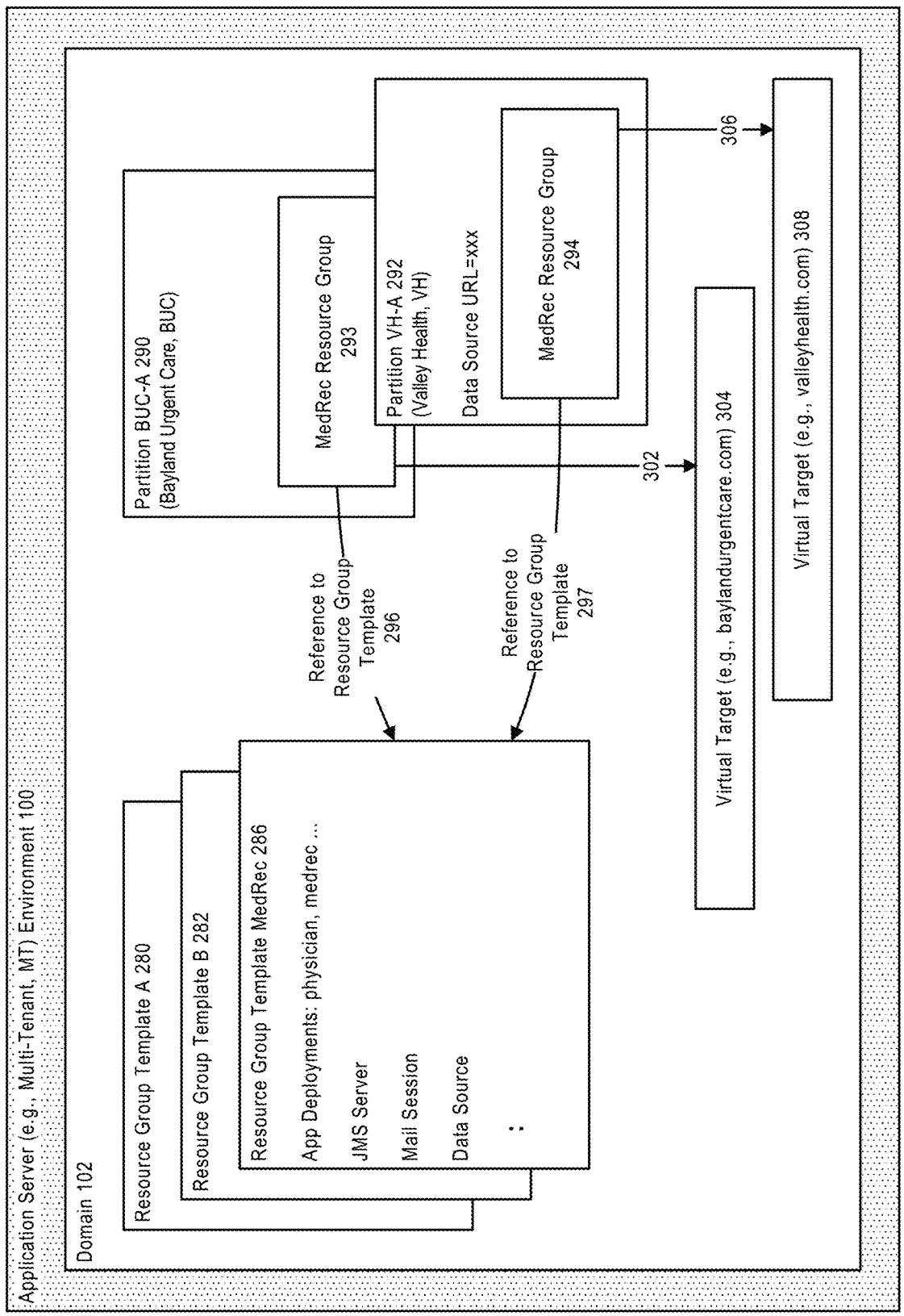
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
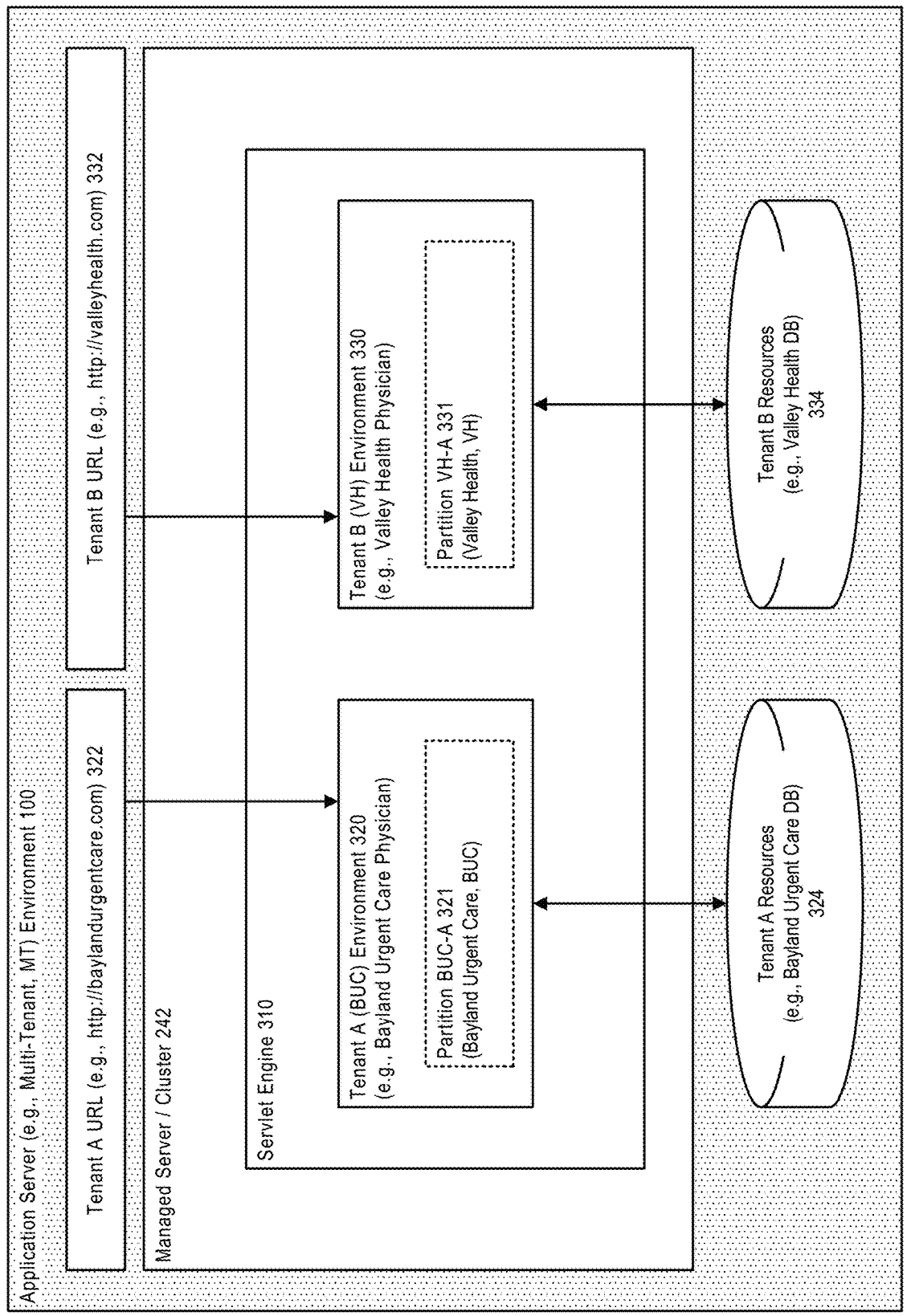
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Multitenant-Aware Patching

In accordance with an embodiment, described herein is a system and method for supporting patching in a multi-tenant application server environment. The system can associate one or more partitions with a tenant, for use by that tenant, wherein a partition is a runtime and administrative subdivision or slice of a domain. A patching process can take advantage of high-availability features provided by an application server clustering environment, to apply patches in a controlled, rolling restart, which maintains a domain's ability to operate without interruption, or with zero downtime. The process can be used to automate complex or long running tasks, including preserving an unpatched or prior version of an application server, application, or other software component for possible rollback, or providing automatic reversion in the event of an unrecoverable error.

In accordance with various embodiments, the description of the patching process provided herein uses some or all of the following concepts:

PSU: patch set update.

ZDT: zero downtime.

Workflow: a sequence of tasks executed by the orchestration framework or patch orchestrator.

Patching primitive: a logical operation representing a reusable portion of the patching rollout.

Out of place patching: the patching of an, e.g., Oracle Home that is running on a nonproduction server, then testing and verifying the patches before pushing it out to production server, in an out of band patching and testing manner that requires less downtime of the production servers and provides the ability to more easily rollback the original version if needed.

Figure 6:
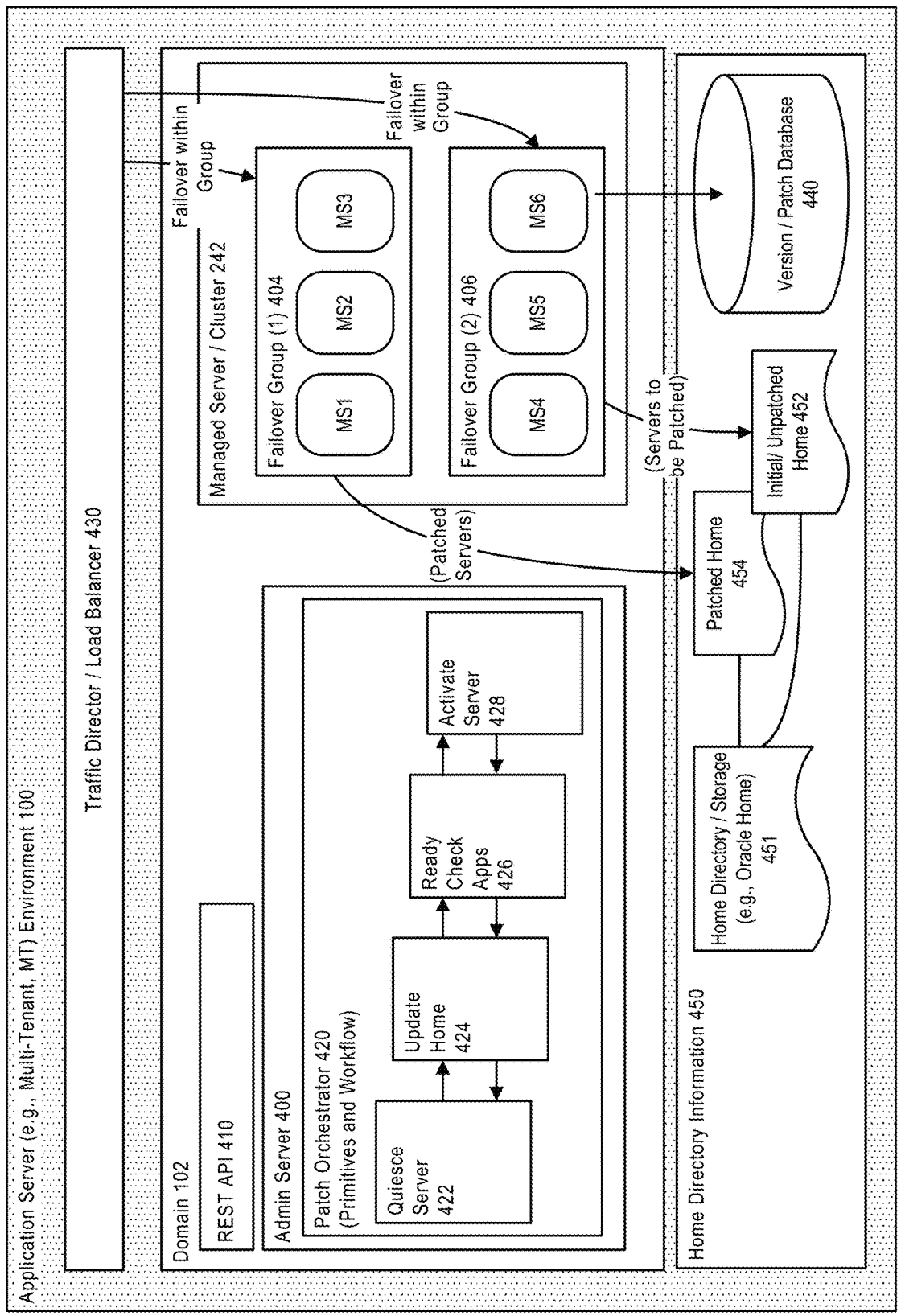
FIG. 6 illustrates support for patching, in accordance with an embodiment.

FIG. 6 illustrates support for patching, in accordance with an embodiment.

As illustrated in FIG. 6, in accordance with an embodiment, the system can include an administration server (admin server) 400, which is responsible for administering a managed server or cluster, including in this example a first failover group 404 of managed servers (here indicated as MS1, MS2 and MS3), and a second failover group of managed servers (here indicated as MS4, MS5 and MS6). The administration server can be accessed by clients via a REST API 410, or another type of interface.

In accordance with an embodiment, the system also includes a patch orchestration framework or patch orchestrator 420, which operates to roll out and/or apply different versions of software components or patches, using a plurality of patching primitives as further described below, as part of a patching workflow.

Generally, the patch orchestrator is designed to operate in a robust manner, and to include support for functionality such as task retry, and rollback semantics.

In accordance with an embodiment, the patch orchestration process leverages a variety of features provided by an application server, to provide advanced functionalities, such as the ability to handle application sessions that may not be backward-compatible; session-aware graceful shutdown which waits for existing sessions in a managed server to finish before shutting down that server; lazy de-serialization of replicated sessions, which turns off automatic de-serialization of replicated sessions during a patching window; dynamic turn on/off of lazy de-serialization to avoid cluster restarts; and failover based on group information, each of which feature or functionalities are further described below.

In accordance with an embodiment, examples of patching primitives that are supported by the patch orchestrator can include Quiesce Server 422, which communicates with a traffic director or other type of load balancer 430, for example an Oracle Traffic Director (OTD), to quiesce traffic to a specified server; Update Home 424, which changes a home directory or other storage's (e.g., Oracle Home) symbolic link (symlink) to point to a new target; Ready Check Apps 426, which communicates with a ready app or similar framework, and completes only when all registered applications are in a ready state; and Activate Server 428, which communicates with, e.g., OTD, to resume sending traffic to a specified server.

In accordance with an embodiment, the patch orchestrator, together with its primitives and workflow, can be used in combination with a patch database 440, to support different versions of software components or patches, including, for example, the information required to patch or update a set of home directories or other storages 450, for one or more managed servers 451, from an initial patched, or an unpatched version 452, to a subsequently-patched version 454.

For example, as illustrated in FIG. 6, the cluster can include two failover groups of managed servers as described above, in which the first failover group and its selection of the managed servers (MS1, MS2 and MS3) use a patched version of the home directory, while a second failover group and the others of the managed servers (MS4, MS5 and MS6) use an initial, or unpatched, version of the home directory.

A request from the traffic director or load balancer can failover to any server within the failover group. As further described below, in accordance with an embodiment, a lazy session deserialization functionality can be used to gracefully handle failover of any sessions that may span the two failover groups, and the managed servers therein.

Figure 7:
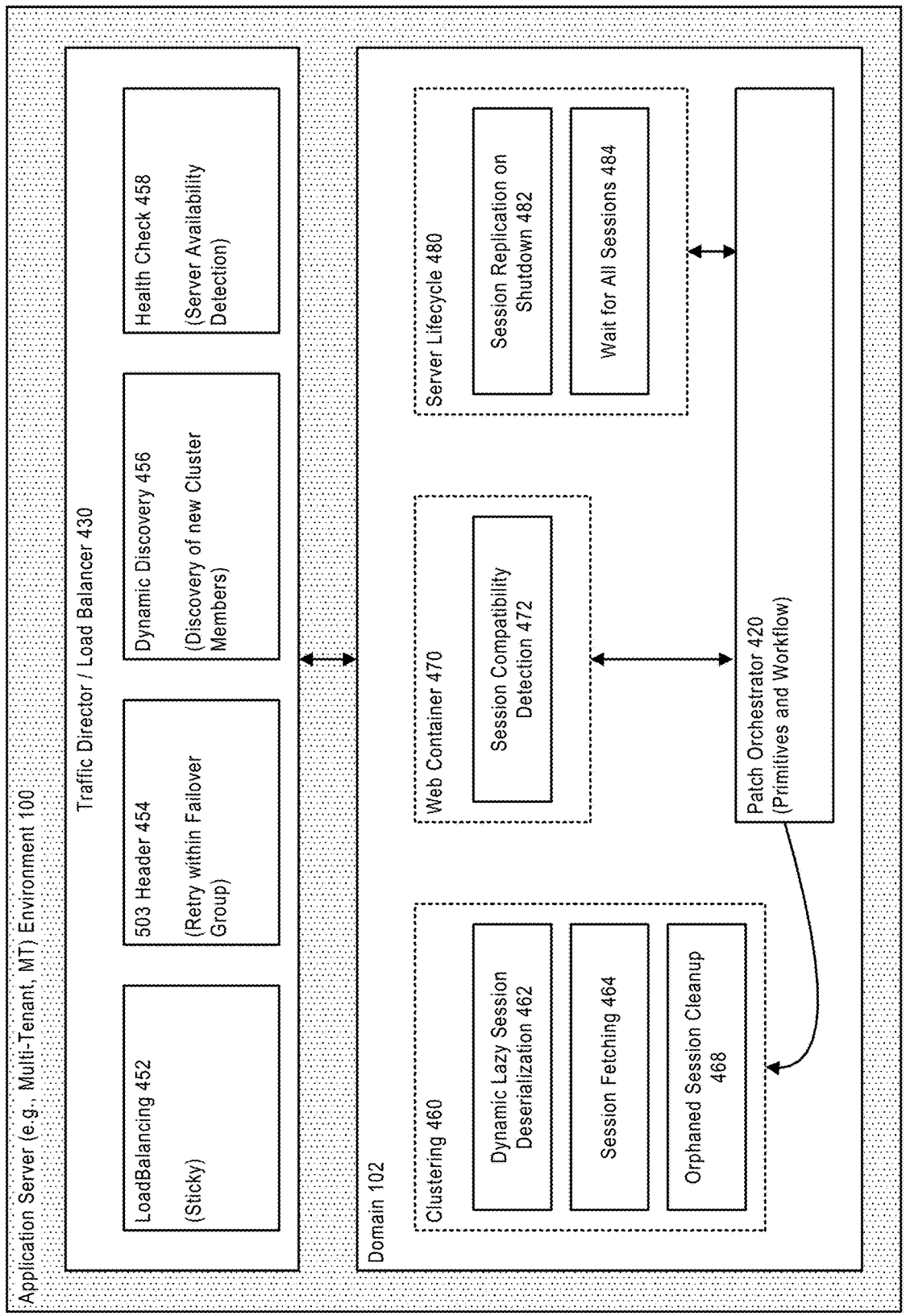
FIG. 7 further illustrates a system for patching, including support for session handling in accordance with an embodiment.

FIG. 7 further illustrates a system for patching, including support for session handling in accordance with an embodiment.

In a typical application server environment, the shutting down and subsequent restarting of a server instance may take some time, perhaps even several minutes. To address this, in accordance with an embodiment, the system includes a smarter session replication process that can be performed on shutdown, including determining whether active sessions are provided anywhere else within the system, and, if not, then making the sessions available before shutting down the intended server.

As illustrated in FIG. 7, in accordance with an embodiment, the traffic director supports functionalities such as load balancing 452, 503 header detection 454, dynamic discovery 456, and health check 458; while the application server clustering environment 460 supports functionalities such as dynamic lazy session deserialization 462, session fetching 464, and orphaned session cleanup 468; the web container 470 supports functionalities such as session compatibility detection 472; and the server lifecycle component 480 supports functionalities such as session replication on shutdown 482, and wait for all sessions 484.

In accordance with an embodiment, each of the above components are described in further detail below, including their usage to address various circumstances such as: dynamic turning on and off of patching support before and after patching; session fetching; orphaned session cleanup to avoid multiple backups; handling of incompatible sessions, including how one server may send a 503 message to a traffic director to instruct it to try a different server; and handling of multiple versions of an application server, application, or other component.

For example, in accordance with an embodiment, the system allows different versions of an application server, application, or other component to be deployed to different partitions, by creating a new partition and setting up a different version of the application server, application, or other component at the new partition. The traffic director can be configured to control how much of and/or which type of traffic should be directed to the old version of the application server, application, or other component, versus the new version of the application server, application, or other component.

Unlike a production redeployment of an application, where only two versions of the application may be deployed (and wherein one version of the application needs to be marked for retirement), in accordance with an embodiment the system allows more than two versions of an application to be deployed and active at the same time, with the only requirement being that they are deployed to different partitions.

In accordance with an embodiment, the system also supports the ability of multiple tenants to share an underlying logic, maintaining a particular patch level at a cluster level, but, for example, moving some partitions to various clusters as necessary if it is determined that those partitions cannot support the particular patch level at that particular time.

Similarly, in accordance with an embodiment, the system supports the ability to use a patch level version of an, e.g, Oracle Home at one node for testing purposes, and then roll out that version of the Oracle Home to other nodes as necessary, once testing has been completed.

Figure 8:
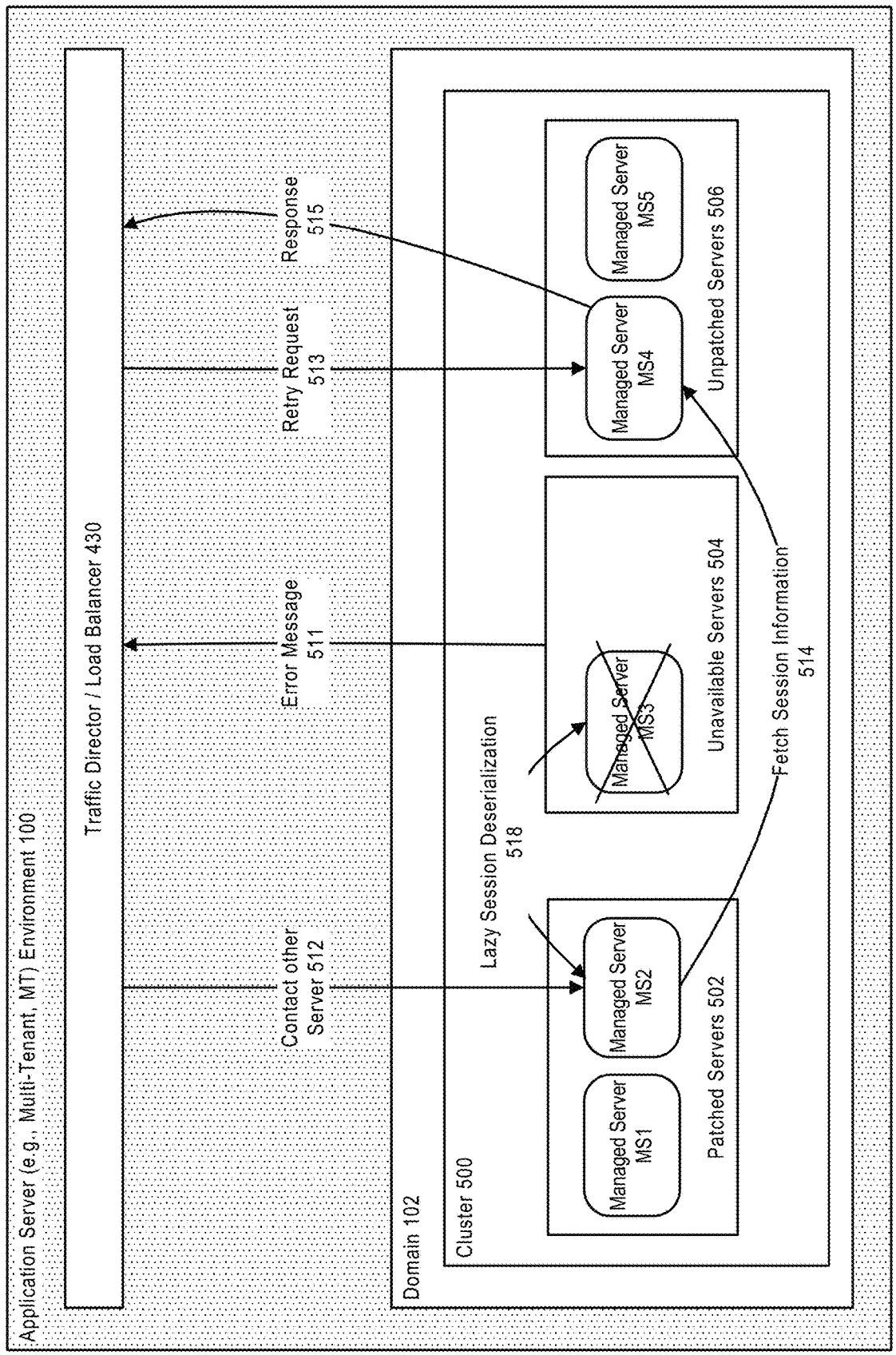
FIG. 8 further illustrates a system for patching, including support for session compatibility detection, in accordance with an embodiment.

FIG. 8 further illustrates a system for patching, including support for session compatibility detection, in accordance with an embodiment.

As illustrated in FIG. 8, in accordance with an embodiment and the example illustrated therein, a cluster 500 can include a plurality of managed servers (here indicated as MS1-MS5), provided in a plurality of groups including groups of patched servers 502, unavailable servers 504, and unpatched servers 506.

In accordance with an embodiment, when a managed server becomes unavailable (here indicated as MS3 being stricken-through), then the traffic director (e.g., OTD) can receive an error message 511 indicative of MS3 being down. The traffic director can try 512 to contact another managed server MS2, which upon detecting a deserialization error will cause the web container to return a 503 message with an, e.g., FailoverGroup header information. The traffic director can retry 513 its request, based on the 503 header information, this time to managed server MS4. The application server at MS4 can then fetch appropriate session information 514 from MS2, and finally respond 515 to the request.

In accordance with an embodiment, the process can leverage the use of a lazy session deserialization 518 functionality, as further described below.

Figure 9:
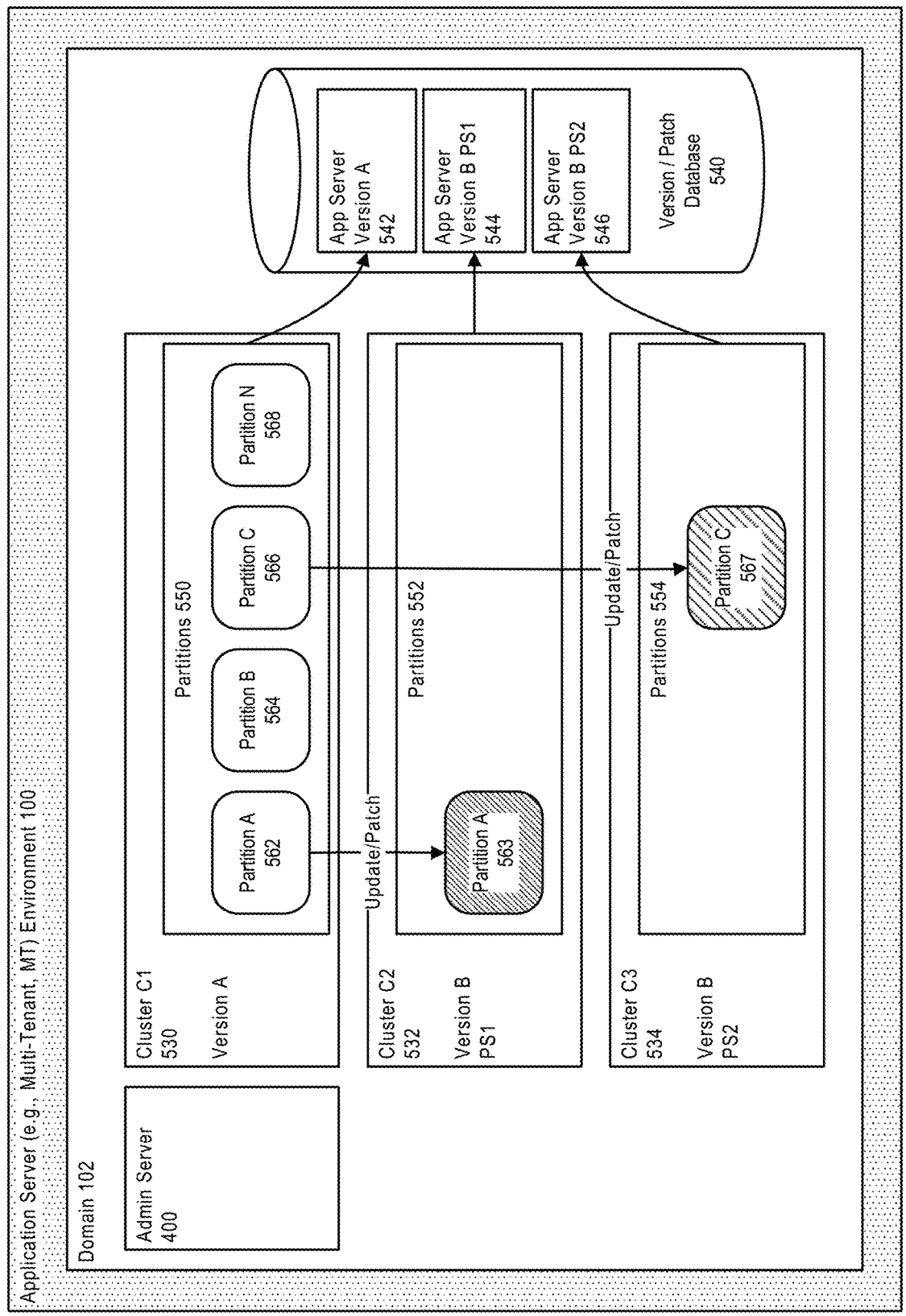
FIG. 9 further illustrates a system for patching, in accordance with an embodiment.

FIG. 9 further illustrates a system for patching, in accordance with an embodiment.

As illustrated in FIG. 9, in accordance with an embodiment, the system allows a cluster within a domain to use a different home directory, for example a different Oracle Home, and therefore operate using a different application server (e.g., WLS) version or patch version. The managed servers for the cluster can either reside on the same, or on different hosts, as any managed servers supporting other clusters from the same domain.

In particular, as illustrated in FIG. 9, the system can include a plurality of clusters, including C1 530, C2 532 and C3 534, each operating one or more partitions 550, 552, 554, here indicated as partition A 562, partition B 564, partition C 566, and partition N 568.

In accordance with an embodiment, a patch database 540 can include version or patch information for a plurality of versions of application server, application, or other component, here indicated as version A 542, version B patch set 1 (PS1) 544, and version B patch set 2 (PS2) 546.

In accordance with an embodiment, different partitions can be migrated and/or patched at different times, so that, for example, the partition A can be migrated from the cluster C1 having a first version A of a particular application server (e.g., WLS), to the cluster C2 having a different version B PS1 of the application server. Similarly, the partition C can be migrated from the cluster C1 having a version A of the application server, to the cluster C3 having yet another different version B PS2 of the application server.

In accordance with an embodiment, some advantages of this patching process include enabling discrete partitions to be migrated to newer (e.g., patched) versions of an application server, application, or other component (e.g., a newer version of WLS), without impacting other partitions sharing the same resources. The patching process also allows A/B testing of, for example, an initial version of a WLS application server versus a patched version of WLS, or the testing of different versions of an application with a particular version of WLS.

In accordance with an embodiment, for a period of time, a partition can be considered as being simultaneously "live" in two clusters (e.g., a source and a target cluster), which allows any existing sessions to complete or to timeout. Once the partition migration is complete, the partition will then be made available only in the target cluster, including any newer (e.g., patched) version of the application server, application, or other component.

Figure 10:
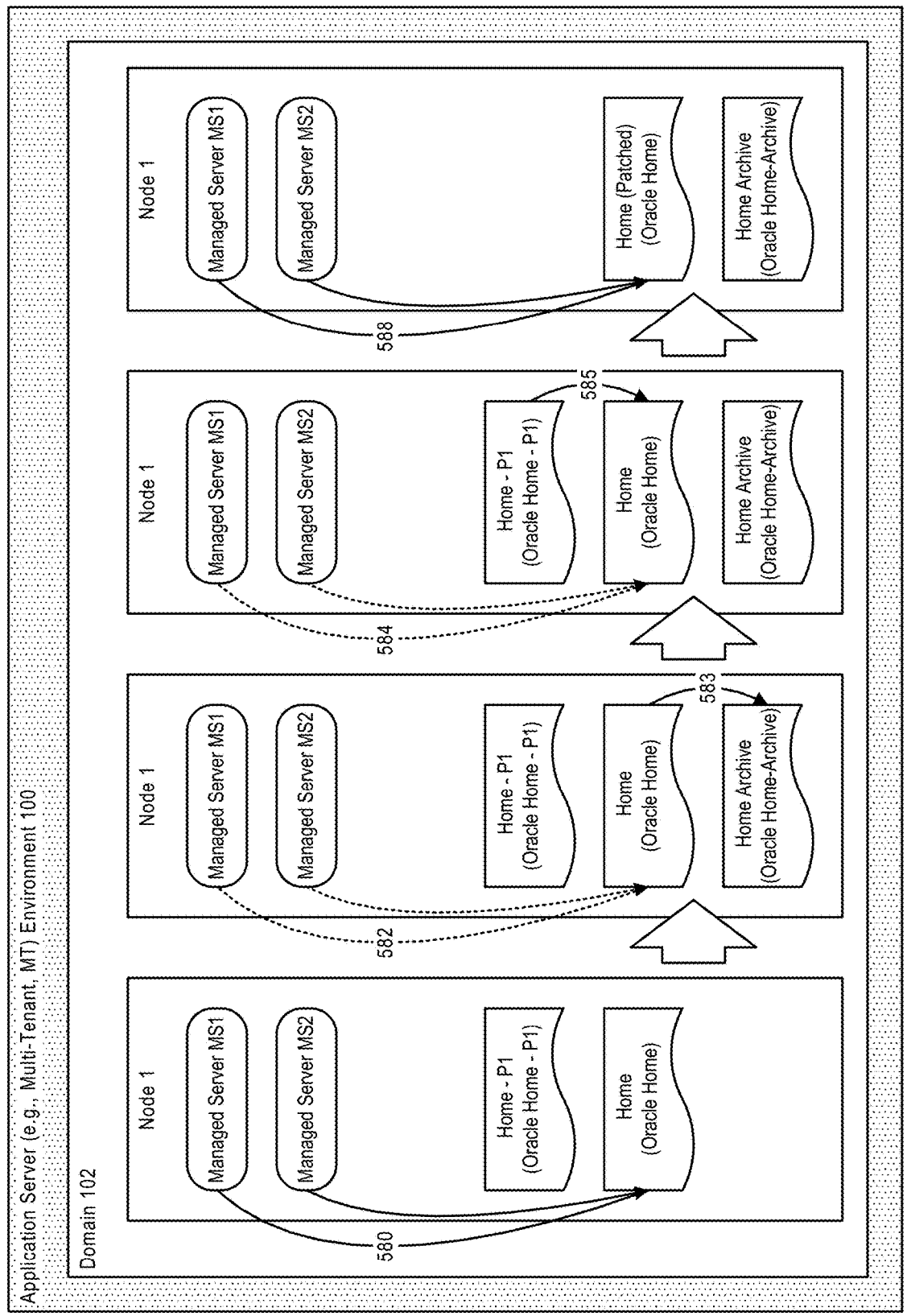
FIG. 10 further illustrates a system for patching, in accordance with an embodiment.

FIG. 10 illustrates a system for patching, in accordance with an embodiment.

As illustrated in FIG. 10, in accordance with an embodiment, to patch one or more computer nodes or servers having an application server, application, or other component running thereon, the servers on those nodes are first gracefully shutdown.

At 580, a prepare switch (e.g., prepareSwitchOracleHome) primitive is called at the node or server to be patched, which directs the node manager for that node or server to setup a script that will perform the switching of its home directory (e.g., Oracle Home). This step is used to provide the node manager with the parameters that it requires to perform the operation.

At 582, a call is made to a restart node manager (e.g., RestartNodeManager) primitive, which causes the node manager at that node to transfer control to a script (e.g., switchOracleHome script), which in turn will move 583 a current home directory (e.g., Oracle Home) to a specified directory path, extract a patched application server, application, or other component image into the original location, and then start the node manager again.

At 584, an assert switch (e.g., AssertSwitchOracleHome) primitive is executed, which will confirm that the switching 585 of the home (e.g., Oracle Home) directories has completed successfully.

At 588, a start server (e.g., StartServers) primitive is called for each node or server, and will not complete until a ready app check (e.g., ReadyAppCheck) returns successfully (if it is configured). This will ensure that all of the patched application server, application, or other components at that node can service requests, before the workflow will shut down any more nodes or servers, and supports limited or no (i.e., zero) downtime.

Figure 11:
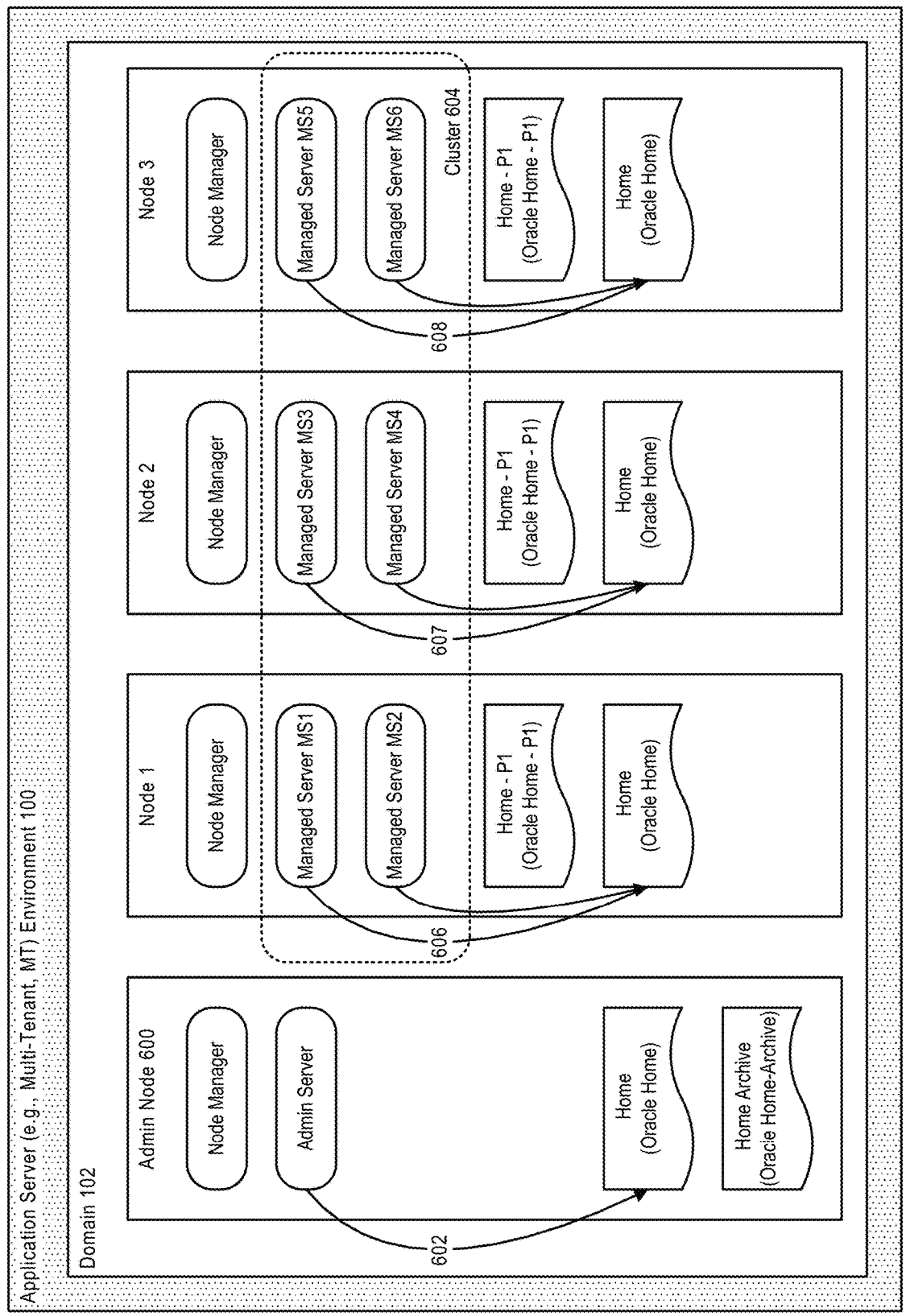
FIG. 11 further illustrates a system for patching, in accordance with an embodiment.
Figure 12:
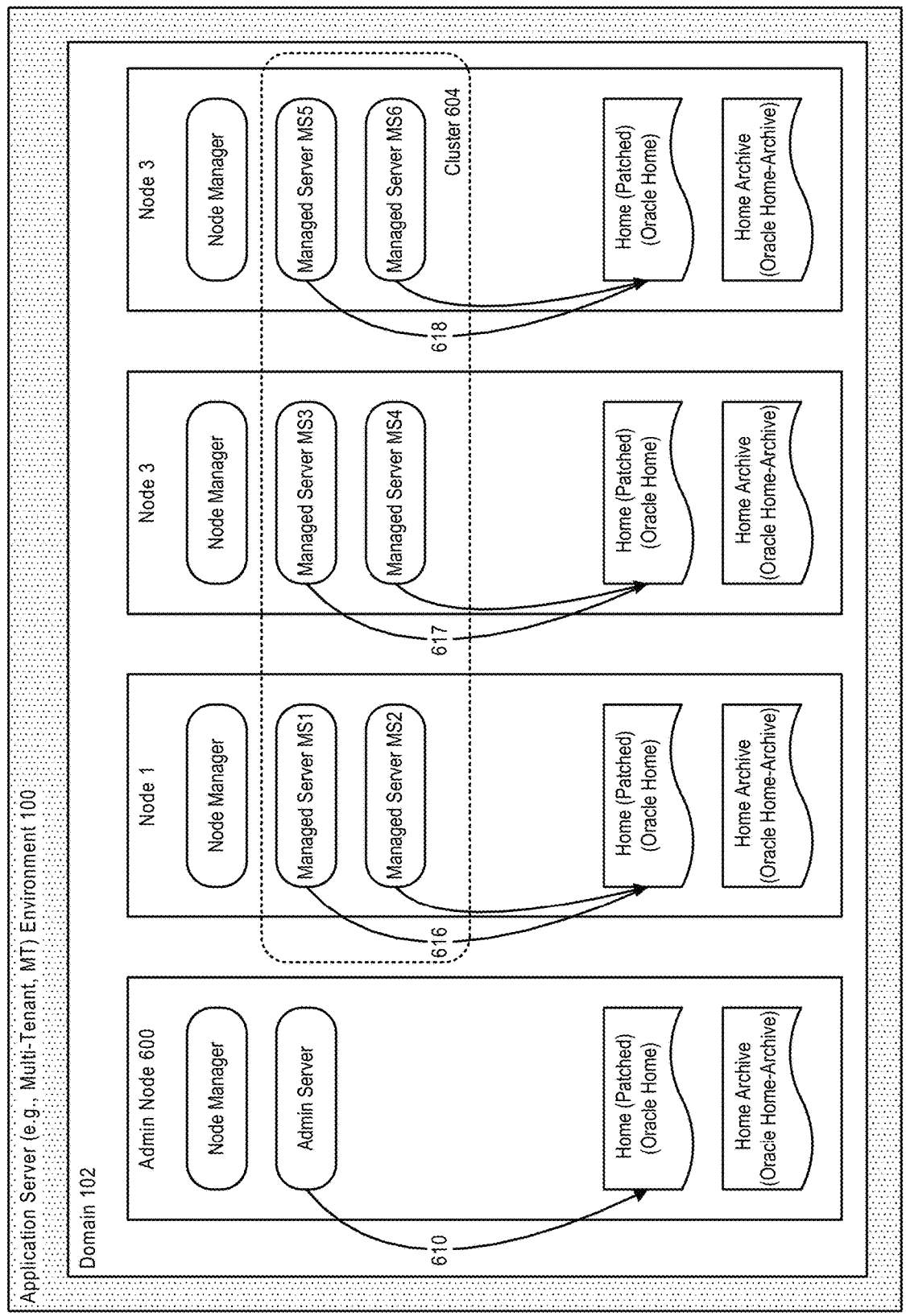
FIG. 12 further illustrates a system for patching, in accordance with an embodiment.

FIGS. 11-12 further illustrate a system for patching, in accordance with an embodiment.

As illustrated in FIGS. 11-12, in accordance with an exemplary embodiment, the system can include a plurality of managed servers in a cluster 604 running across three physical machines or nodes (here indicated as computer nodes 1-3), with an admin server running by itself on its own machine (here indicated as admin node 600). Each pair of managed servers in a cluster on the same machine shares the same local domain directory and the same local home (e.g., Oracle Home) directory. Each machine includes its own node manager.

In accordance with an embodiment, initially the admin server and managed servers use the original home directory 602, 606, 607, 608. The patching process can proceed by copying a patched version to each managed server; and then performing a rollout to the admin server (with no service interruption) 610.

In accordance with an embodiment, the managed servers are sufficiently distributed across enough machines to be able to provide failover of the application server, application, or other component being patched, even while some managed servers are temporarily shut down. The managed servers are then patched, and a rolling restart pointing at patched shared storage 616, 617, 618 is then performed. The process results in no session losses due to state replication, and limited or no (i.e., zero) downtime.

Exemplary Embodiment

In accordance with an exemplary embodiment, out-of-place patching takes advantage of existing high availability features built into clustering to apply patches in a controlled, rolling restart that maintains a domain's ability to operate without interruption. The process is designed to reduce exposure by automating complicated and long running tasks, preserving an unpatched (or prior) version for rollback, and providing automatic reversion in the event of an unrecoverable error. At a high level, the process is to: clone the Oracle Home directory or directories being used by servers in the domain; apply the zero downtime compatible patches to the duplicate directories; and start an orchestration task that will handle the rollout.

In accordance with an embodiment, the rollout task will coordinate the following for each server in turn: gracefully shutdown the servers on a node sharing a common domain (directory); restart the node manager associated with the server; move the current Oracle Home directory to a backup location and deploy the specified Oracle Home directory in its place; and start the server and wait for ReadyAppsCheck if configured.

In some cases, based on the configuration of the servers, it may be desirable to have more than one server shut down at a time. The number of servers that are shut down at any one time should be kept as small as possible to minimize the impact of the rollout. There will always be at least one server in a cluster that is up and able to respond to requests.

In the event of an unrecoverable error, the rollout task will automatically revert any changes it has made, so that the servers will be returned to their original state (prior version). This will ensure that the domain is fully available while the error is diagnosed and resolved. The rollback is made possible by preserving the original Oracle Home directory, and is part of the reason the patches are applied to a duplicate directory instead of the original. If another error is encountered during the rollback process that prohibits the rollback from completing, an error will be raised and the process will stop to allow investigation. Once the error is cleared, the revert process can be resumed.

Initial Installation and Configuration

In accordance with an embodiment, in order to facilitate out-of-place patching, there are several requirements for the installation of the application server (e.g., WLS) across the servers that must be met.

There are many places in the domain where the location of the Oracle Home is referenced. This includes variables in start scripts, properties files, and xml configuration files. It is generally not practical to find and update all of the locations to point to a new version of Oracle Home. For this reason, in accordance with an embodiment, the rollout works by moving the existing Oracle Home (to a user specified backup location) and expanding the desired Oracle Home in its place. In order to ensure that this procedure does not affect managed servers that are still running, the Oracle Home directory must be used by all of the affected managed servers on a machine, and by no managed servers on other machines. The Oracle Home must also be in a location that is writable by the node manager process. To ensure these conditions, the Oracle Home directory can be installed on a hard drive that is local to the affected managed servers.

The key to maintaining uptime while upgrading the servers is taking advantage of high availability configured with clusters. A minimum number of servers within a cluster must remain operational at all times. Since servers within a cluster on the same machine will need to be restarted together (if they share a common domain directory), it is required that the servers within a cluster are hosted on at least two different physical machines, but a minimum of three machines per cluster is recommended. This will allow some to stay up and provide service while the others are brought down as part of the rolling restart.

When determining the number of servers available on different machines to handle the requests, it is important to exclude managed servers that are running but are in either Admin or Standby mode, as these servers will not respond to requests.

The rollout process can be greatly complicated if an admin server and a managed server need to be updated at the same time. This would be the case if an admin server and a managed server were configured to run on the same machine and share the same domain directory. The admin server would need to be brought down at the same time as the managed servers since it would be running from a shared Oracle Home directory. This restriction will not apply if managed servers' installation homes are isolated to allow for rolling out patches on a per managed server basis. For this reason, two different configurations are supported that simplify this issue:

1. The first is to have the admin server running on a machine without any managed servers running on it. This allows the admin server to be updated in a step by itself, and once that is complete, the next step will be to update the managed servers in that domain on different machines.

2. The second configuration is to allow the admin server to run on the same machine as a managed server, but to make it run out of its own separate domain directory. This would again allow the admin server to be updated individually, and the managed servers could be updated in their own step.

In addition to providing a mechanism that will update all the servers in a domain, this feature also provides the ability to update individual clusters within a domain. When the user is attempting to use the cluster rollout mode, if there are multiple managed servers on a single node serving different clusters, the managed servers must have separate domain directories according to the cluster they are serving. Their domain directories must also point to separate Oracle Home directories, and they must be managed by a separate instance of the node manager as well. This is required so that all of the managed servers on a node for a cluster can be brought down and have their Oracle Home directory updated without affecting the Oracle Home directory of the managed servers that are serving the other cluster (and are still running).

Patching different partitions at different times within a domain is not explicitly supported as such, but is possible to achieve by managing the partitions and using cluster level patching. Depending on how partitions are used in the environment, it may be desirable to upgrade one partition without upgrading another. An example of this might be an environment where each partition is being used by a different tenant and one tenant needs to upgrade, but the other tenant doesn't have an available maintenance window. In this situation a partition migration feature can be used to separate the partitions. The partition needing upgrade can be migrated to a different cluster (existing or newly created), and cluster level rollout can be performed on the new cluster. The simplest way to accomplish this is if the new cluster is hosted on different physical machines from the original cluster, which will ensure that the domain directory, Oracle Home, and node manager do not overlap. If no other physical resources are available, this procedure can still be supported as long as the new cluster has its own copy of the domain directory pointing to its own copy of the Oracle Home directory, and has its own instance of node manager running on each affected machine.

In accordance with an embodiment, the node manager is responsible for moving the current Oracle Home to the specified backup directory, and extracting or copying the new Oracle Home in its place. The node manager must also be restarted in order to run out of the new directory. In order to coordinate this, each node must have its own node manager.

For example, in FIGS. 10-12 described above, the system includes multiple managed servers in a cluster running across three physical machines, with an admin server running by itself on its own machine. Each pair of managed servers in a cluster on the same machine shares the same local domain directory and the same local Oracle Home directory; and each machine has its own node manager running.

Cloning and Patching the Cloned Image

In accordance with an embodiment, for cloning an existing image and patching the cloned image, the system can relying on existing tooling, for example the use of FMW Movement scripts for cloning the existing Oracle Home. Once the cloned Oracle Home exists, the user can then use the existing OPatch tooling to patch the image. A description of cloning Oracle Home with FMW Movement scripts follows:

1. Use copyBinary.sh to make an archive of the WLS install.

2. Use pasteBinary.sh to a new directory to make a clone of the WLS install (updates the central inventory file). Once the clone has been created the use can run the Oracle Universal Installer and see that the clone has been registered with the central inventory.

Automated Rollout

As described above, in accordance with an embodiment, rolling out an update with zero downtime is made possible in large part by leveraging the high availability features of server clustering. With server clustering, one or more of the managed servers can be offline without causing the application to suffer downtime. In fact, with graceful server shutdowns, it is possible in most cases to prevent even a single session from being lost. The coordination of taking down servers, updating them, and bringing them back into service can be handled by creating custom commands called patching primitives and executing them using the orchestration framework. The commands analyze the topology of the domain and determine the best way to safely update all of the servers and node managers in turn; while the orchestration framework provides monitoring and error handling of the process.

In accordance with an embodiment, in order for this mechanism to work properly, the managed servers within the cluster being upgraded must be spread across two or more physical machines. This is because all servers within a cluster hosted by the same machine will share a common domain directory and therefore must be brought down together. In order to avoid downtime, some of the servers in the cluster must be running on a different machine from the others. This way there are always some servers available to service requests.

Another constraint introduced by this technique is the requirement that the patches applied to a cloned Oracle Home must leave the servers in a state where they are still compatible with the unpatched servers. More specifically, in the event of a server failing during the patch rollout, it must be possible for a user's session to be seamlessly migrated between a patched and unpatched server.

In accordance with an embodiment, there are several operations that can be rolled out in this manner. These include rolling out a patched Oracle Home, updating the location of JAVA_HOME across servers, replacing applications with updated versions, and any combination of those operations in a single rollout. The ability to perform a rolling restart across all servers is also provided.

Exemplary Patching APIs

In accordance with an embodiment, described below are exemplary patching APIs which can be used to roll out upgrades or patches. In accordance with other embodiments, different and/or additional patching API's can be supported.

```
rolloutUpdate(target, [rolloutOracleHome, backupOracleHome,
isRollback], [javaHome], [applicationProperties], [options])
rolloutJavaHome(target, javaHome, [options])
rolloutApplications(target, applicationProperties, [options])
rolloutOracleHome(target, rolloutOracleHome, backupOracleHome,
isRollback, [options])
rollingRestart(target)
```

RolloutUpdate Command

In accordance with an embodiment, the rolloutUpdate command provides the ability to update the Oracle Home, Java Home, and applications on the servers. It also allows for any combination of those changes, depending on which of the optional parameters are specified. To update the Oracle Home, the user must specify the rolloutOracleHome, backupOracleHome, and isRollback parameters. To update JavaHome, the user must specify the javaHome parameter. To update applications, the user must specify the applicationProperties parameter. The isDryRun and autoRevertOnFailure options are valid for all cases, the isSessionCompatible option will only be considered if the applications and/or Oracle Home are being modified. There is no restrictions on which updates can be performed during a single rollout. If the user doesn't specify the Oracle Home parameters, JavaHome parameter, or ApplicationProperties parameter, then a rolling restart will be performed.

Syntax rolloutUpdate(target, [rolloutOracleHome, backupOracleHome, isRollback], [javaHome], [applicationProperties], [options])

| Argument | Definition |
| --- | --- |
| target | A way of specifying which servers will be affected, based either on their domain, cluster, or name<br>The name of the domain - changes will be applied to all servers in the domain<br>The name of a cluster, or a comma separated list of clusters - changes will be applied to all servers belonging to one of the specified clusters<br>The name of a server, or a comma separated list of servers - changes will be applied to all specified servers |
| rolloutOracleHome | The location of the archive or local directory containing the version of Oracle Home to rollout, that will replace the current Oracle Home. The archive is typically a jar file created with the copyBinary script |
| backupOracleHome | The name of a local directory to which the current Oracle Home will be moved/renamed |
| isRollback | Allows the user to specify that the change being rolled out to a domain is to a previous patch release of Oracle Home. This information is important in determining whether the Admin Server should be updated first or last.<br>TRUE if the target is the domain and the Oracle Home being rolled out has a lower patch version than the current Oracle Home, otherwise FALSE |
| javaHome | The location of the new JAVA_HOME to use. The new JAVA_HOME must refer to a valid JAVA_HOME path installed on each machine. The rollout operation will not run the Java installer. |
| applicationProperties | Used to specify the location of a readable file on the Admin Server containing information about each app that will be upgraded the file is a text file with the application information specified in JSON format, as illustrated here:<br>{"applications":[<br>{<br>"applicationName":"App1",<br>"patchedLocation":"/pathto/patchedLocation1",<br>"backupLocation":"/pathto/backupLocation1"<br>},<br>{<br>"applicationName":"App2",<br>"patchedLocation":"/pathto/patchedLocation2",<br>"backupLocation":"/pathto/backupLocation2"<br>},<br>{<br>"applicationName":"App3",<br>"patchedLocation":"/pathto/patchedLocation3",<br>"backupLocation":"/pathto/backupLocation3"<br>}<br>] } |
| options | Optional. Comma-separated list of rollout options, specified as name-value pairs. Valid options include:<br>isDryRun = TRUE if the operation is to be evaluated but not executed, default is FALSE<br>autoRevertOnFailure = TRUE (default) if the operation should automatically revert on failure, FALSE if the operation should stop on failure and wait for the user to resume it<br>isSessionCompatible = TRUE if the sessions between the patched and unpatched versions of Oracle Home are compatible (affects session handling and graceful server shutdown times), FALSE (default) if special consideration should be taken into account to preserve unpatched sessions (could impact the time it takes for the rollout to complete) |

Example

Rollout a new patched Oracle Home:

```
> progress = rolloutUpdate(DomainA, /pathto/wls1221p2.jar,
/pathto/backupOfwls1221p1, FALSE)
```

Rollback to the original Oracle Home:

```
> progress = rolloutUpdate(DomainA, /pathto/backupOfwls1221p1,
/pathto/backupOfwls1221p2-broken, TRUE)
```

Rollout only a new version of Java:

```
>progress=rolloutUpdate(DomainA,    javaHome=/pathto/
jdk1.8.0_55)
```

Rollout only upgraded applications

```
> progress = rolloutUpdate(DomainA,
applicationProperties=/pathto/applicationProperties)
```

Rollout a new patched Oracle Home with a new version of Java

```
> progress = rolloutUpdate(DomainA, /pathto/wls1221p2.jar,
  /pathto/backupOfwls1221p1, FALSE, /pathto/jdk1.8.0_55)
```

Rollout a new patched Oracle Home, a new version of Java, and upgraded applications

```
> progress = rolloutUpdate(DomainA, /pathto/wls1221p2.jar,
  /pathto/backupOfwls1221p1, FALSE, /pathto/jdk1.8.0_55,
  /pathto/applicationProperties)
```

RolloutOracleHome Command

In accordance with an embodiment, the rolloutOracleHome command provides the ability to update the Oracle Home. The rolloutOracleHome task is responsible for figuring out which servers need to be updated, in which order, and for creating a workflow that will update them safely. This includes graceful shutdown of the servers, replacing the Oracle Home directory, restarting the node manager, and starting the servers again. The rollout task will return a WorkflowProgressMBean that can be polled for status.

Syntax
rolloutOracleHome(target, rolloutOracleHome, backupOracleHome, isRollback, [options])

Example

Rollout a patched Oracle Home

```
> progress = rolloutOracleHome(DomainA, /pathto/wls1221p2.jar,
  /pathto/backupOfwls1221p1, FALSE)
```

RolloutJavaHome Command

In accordance with an embodiment, the rolloutJavaHome command provides the ability to update the JavaHome used by the affected servers. The rolloutJavaHome task is responsible for figuring out which servers need to be updated, in which order, and for creating a workflow that will update them safely. This includes graceful shutdown of the servers, updating the location of the JavaHome they use, restarting the node manager, and starting the servers again. This task will return a WorkflowProgressMBean that can be polled for status.

| Argument | Definition |
| --- | --- |
| target | A way of specifying which servers will be affected, based either on their domain, cluster, or name |
| | The name of the domain - changes will be applied to all servers in the domain |
| | The name of a cluster, or a comma separated list of clusters - changes will be applied to all servers belonging to one of the specified clusters |
| | The name of a server, or a comma separated list of servers - changes will be applied to all specified servers |
| rolloutOracleHome | The location of the archive or local directory containing the version of Oracle Home to rollout, that will replace the current Oracle Home. The archive is typically a jar file created with the copyBinary script |
| backupOracleHome | The name of a local directory to which the current Oracle Home will be moved/renamed |
| isRollback | Allows the user to specify that the change being rolled out to a domain is to a previous patch release of Oracle Home. This information is important in determining whether the Admin Server should be updated first or last. |
| | TRUE if the target is the domain and the Oracle Home being rolled out has a lower patch version than the current Oracle Home, otherwise FALSE |
| options | Optional. Comma-separated list of rollout options, specified as name-value pairs. Valid options include: |
| | isDryRun = TRUE if the operation is to be evaluated but not executed, default is FALSE |
| | autoRevertOnFailure = TRUE (default) if the operation should automatically revert on failure, FALSE if the operation should stop on failure and wait for the user to resume it |
| | isSessionCompatible = TRUE if the sessions between the patched and unpatched versions of Oracle Home are compatible (affects session handling and graceful server shutdown times), FALSE (default) if special consideration should be taken into account to preserve unpatched sessions (could impact the time it takes for the rollout to complete) |

Syntax rolloutJavaHome(target, javaHome, [options])

| Argument | Definition |
|---|---|
| target | A way of specifying which servers will be affected, based either on their domain, cluster, or name<br>The name of the domain - changes will be applied to all servers in the domain<br>The name of a cluster, or a comma separated list of clusters - changes will be applied to all servers belonging to one of the specified clusters<br>The name of a server, or a comma separated list of servers - changes will be applied to all specified servers |
| javaHome | The location of the new JAVA_HOME to use. The new JAVA_HOME must refer to a valid JAVA_HOME path installed on each machine. The rollout operation will not run the Java installer. |
| options | Optional. Comma-separated list of rollout options, specified as name-value pairs. Valid options include:<br>isDryRun = TRUE if the operation is to be evaluated but not executed, default is FALSE<br>autoRevertOnFailure = TRUE (default) if the operation should automatically revert on failure, FALSE if the operation should stop on failure and wait for the user to resume it |

Example

Update the JavaHome on all servers in the domain to use the latest installed version of java:
>progress=rolloutJavaHome(DomainA, /pathto/jdk1.8.0_55)

RolloutApplications Command

In accordance with an embodiment, the rolloutApplications command provides the ability to update the applications deployed on the servers. The rolloutApplications task is responsible for figuring out which servers need to be updated, in which order, and for creating a workflow that will update them safely. This includes graceful shutdown of the servers, updating the applications, restarting the node manager, and starting the servers again. This task will return a WorkflowProgressMBean that can be polled for status.

Syntax rolloutApplications(target, applicationProperties, [options])

| Argument | Definition |
|---|---|
| target | A way of specifying which servers will be affected, based either on their domain, cluster, or name<br>The name of the domain - changes will be applied to all servers in the domain<br>The name of a cluster, or a comma separated list of clusters - changes will be applied to all servers belonging to one of the specified clusters<br>The name of a server, or a comma separated list of servers - changes will be applied to all specified servers |
| applicationProperties | Used to specify the location of a readable file on the Admin Server containing information about each app that will be upgraded the file is a text file with the application information specified in JSON format, as illustrated here:<br>"applications":[<br>{<br>"applicationName":"App1",<br>"patchedLocation":"/pathto/patchedLocation1",<br>"backupLocation":"/pathto/backupLocation1"<br>},<br>{<br>"applicationName":"App2",<br>"patchedLocation":"/pathto/patchedLocation2",<br>"backupLocation":"/pathto/backupLocation2"<br>},<br>{<br>"applicationName":"App3",<br>"patchedLocation":"/pathto/patchedLocation3",<br>"backupLocation":"/pathto/backupLocation3"<br>}<br>] |
| options | Optional. Comma-separated list of rollout options, specified as name-value pairs. Valid options include:<br>isDryRun = TRUE if the operation is to be evaluated but not executed, default is FALSE<br>autoRevertOnFailure = TRUE (default) if the operation should automatically revert on failure, FALSE if the operation should stop on failure and wait for the user to resume it<br>isSessionCompatible = TRUE if the sessions between the patched and unpatched versions of Oracle Home are compatible (affects session handling and graceful server shutdown times), FALSE (default) if special consideration should be taken into account to preserve unpatched sessions (could impact the time it takes for the rollout to complete) |

Example

Rollout upgraded applications
>progress=rolloutApplications(DomainA, /pathto/applicationProperties)

RollingRestart Command

In accordance with an embodiment, the rollingRestart command provides the ability to sequentially restart servers. The rollingRestart task is responsible for figuring out which servers need to be restarted and for creating a workflow that will restart them safely. This includes graceful shutdown of the servers and starting them up again. This task will return a WorkflowProgressMBean that can be polled for status.

Syntax
rollingRestart(target, [options])

| Argument | Definition |
| --- | --- |
| target | A way of specifying which servers will be affected, based either on their domain, cluster, or name<br>The name of the domain - changes will be applied to all servers in the domain<br>The name of a cluster, or a comma separated list of clusters - changes will be applied to all servers belonging to one of the specified clusters<br>The name of a server, or a comma separated list of servers - changes will be applied to all specified servers |
| options | Optional. Comma-separated list of rollout options, specified as name-value pairs. Valid options include:<br>isDryRun = TRUE if the operation is to be evaluated but not executed, default is FALSE<br>autoRevertOnFailure = TRUE (default) if the operation should automatically revert on failure, FALSE if the operation should stop on failure and wait for the user to resume |

Example

Do a rolling restart of all servers in the domain
>progress=rollingRestart(DomainA)

Updating Java Home

In accordance with an embodiment, the zero downtime patching feature provides a mechanism for updating the JAVA_HOME setting for servers in the specified target. There are two ways to initiate this process, one is to use the standalone command rolloutJavaHome, and the other is by specifying the optional javaHome parameter to the rolloutUpdate command. When using the latter, it is possible to update Oracle Home and/or applications in the same rollout. The functionality of setting the JAVA_HOME is the same regardless of whether Oracle Home or applications are upgraded as well.

In accordance with an embodiment, the topology prerequisites described above for updating Oracle Home also apply to updating JavaHome. In addition, in order to be able to provide this functionality, it is required that the version of Java to set JAVA_HOME to point at is already installed somewhere that is locally accessible and that the path to JAVA_HOME is the same for all affected servers. Installing Java before shutting down the servers means that each version of Java (the current and the new versions) must have a separate, unique path to them.

In accordance with an embodiment, to rollout a change to JavaHome, all servers on a machine sharing the same Oracle Home must be shutdown together, along with the node manager running on that machine. While they are shutdown, a native script will use a special form of pasteBinary to update all of the scripts in the Oracle Home directory to use the new JAVA_HOME location. The Java update script will then modify the requisite start scripts in the domain directory to also use the new path for JAVA_HOME. Then the node manager and the servers on that machine will be started again. All scripts under Oracle Home containing a reference to JAVA_HOME will point to the specified JAVA_HOME. All scripts under the current domain directory containing a reference to JAVA_HOME will point to the specified JAVA_HOME.

The easiest way to rollback a change to JavaHome that has been successfully performed is simply to execute a new updateJavaHome command with the old location as the new path. However, in some instances the system also supports rolling back an Oracle Home change that also changed JavaHome. Returning the Oracle Home scripts to their original state happens as an inherent part of restoring the Oracle Home directory to a previous state. Rolling back the domain scripts may not be as straightforward because the user may not specify the original (desired) JavaHome location when issuing the rollback command. In order to address this issue, the updateOracleHome command can be adapted so that when the Oracle Home directory is moved to the backup location, it also includes an additional directory, called "domainBackup" that will hold a copy of the current version of the relevant domain scripts at the time of the update. This way, if the user performs the rollback command in the future from our backed-up Oracle Home location, those domain files can be copied back into place.

Updating Applications

As described above, in accordance with an embodiment, the zero downtime patching feature provides a mechanism for updating applications deployed to application servers as well. One mechanism for this is to include them in the Oracle Home directory and no-stage deploy them from there. Updating applications deployed this way happens when a new version of the Oracle Home (with the updated applications included) is rolled out. Applications deployed in this manner do not require any additional information or steps other than having the latest version included with the new Oracle Home being rolled out. The process for updating applications outside of the Oracle Home directory is different for staged and no-staged applications, but in both cases involves locating the current application directory, moving that directory to a backup location, and moving an application directory containing the new version of the application into the location of the original, essentially replacing the old application code with the new application code. This operation cannot be performed while the original directory is being accessed, so the affected servers must be shut down during this procedure. However, since the node manager is independent of the application code, this process can be done while node manager is still running (unlike updating Oracle Home or JavaHome). Similarly to rolling out a new Oracle Home, there is some preparation required. For example, the directory containing the new application code must be distributed to all affected nodes before the rollout is started, and it must be in the same path for each node.

Figure 13:
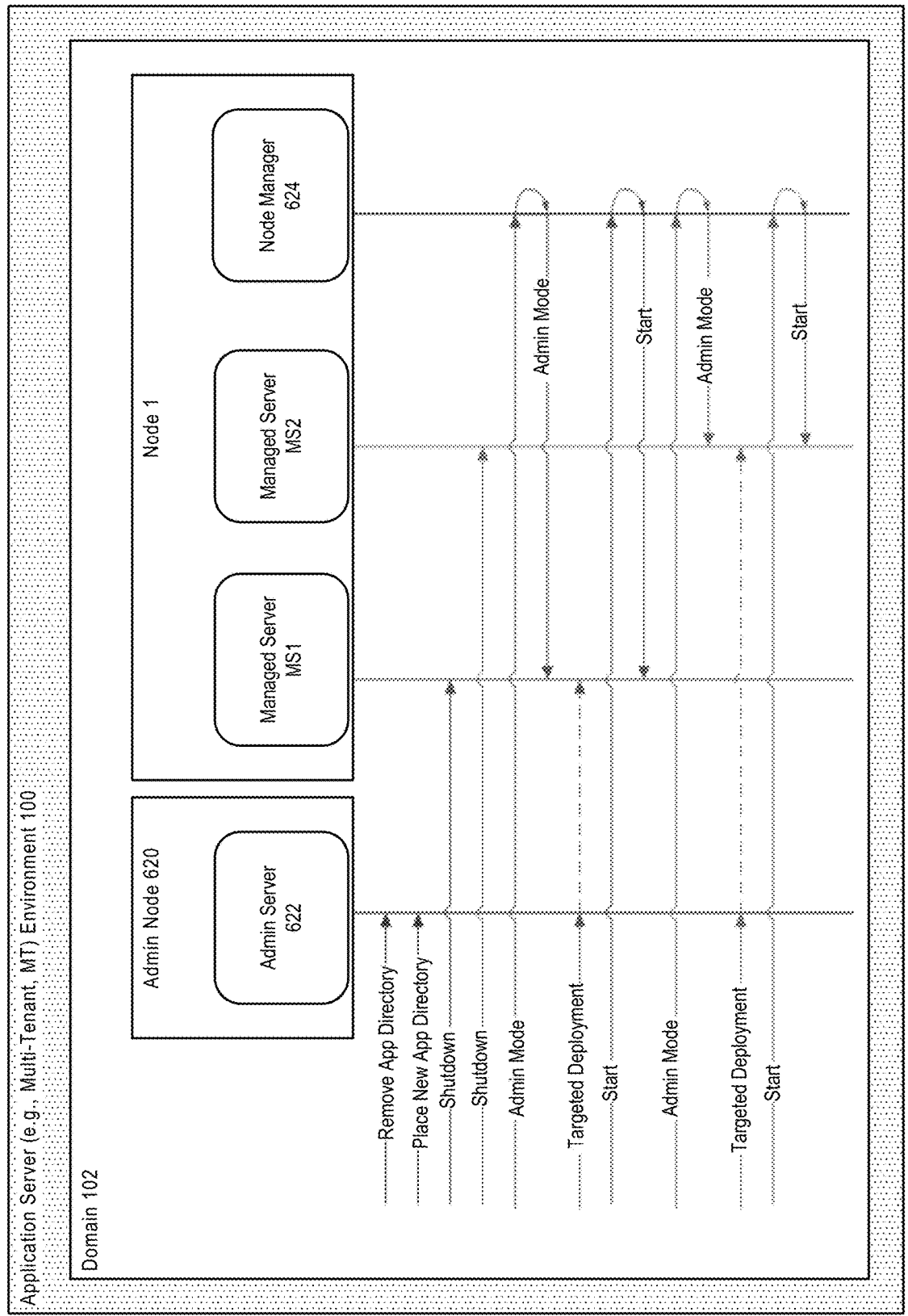
FIG. 13 illustrates a patching event diagram, in accordance with an embodiment.
Figure 14:
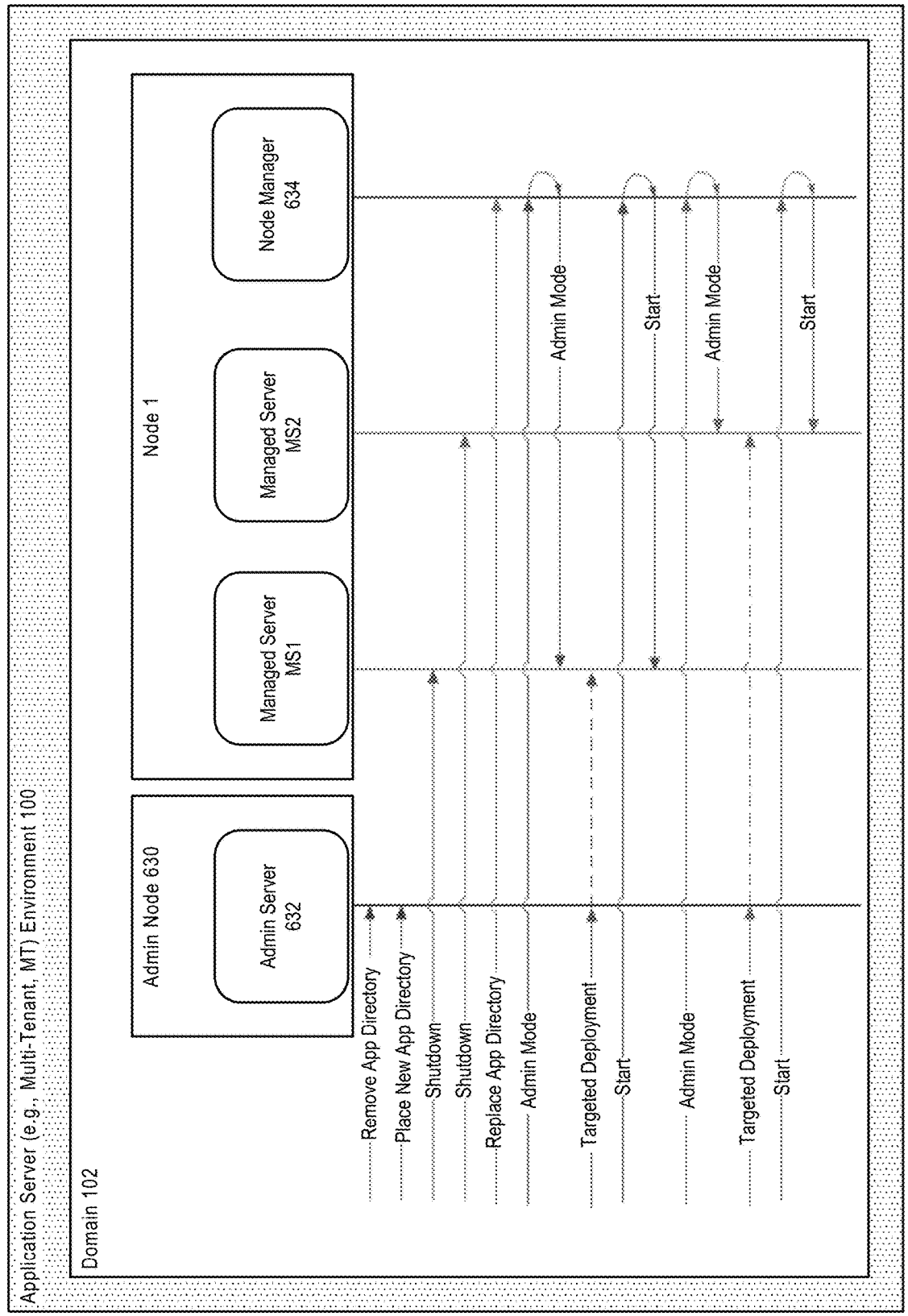
FIG. 14 illustrates another patching event diagram, in accordance with an embodiment.
Figure 15:
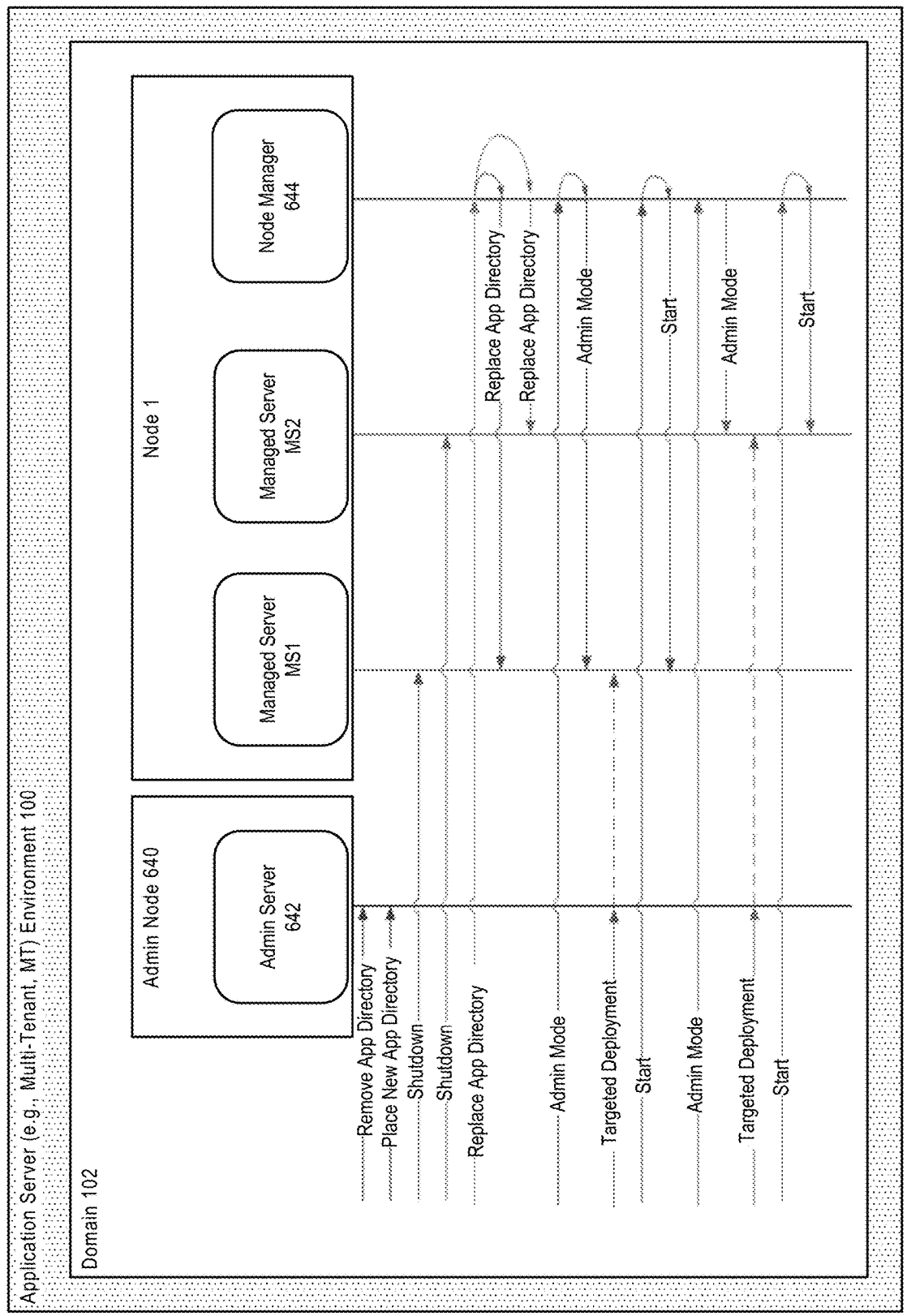
FIG. 15 illustrates another patching event diagram, in accordance with an embodiment.

FIGS. 13-15 illustrate patching event diagrams, in accordance with an embodiment.

Due to the fact that staged, no-stage, and external-stage applications are deployed differently, they require different treatment in order to be updated properly. In all modes, the new application source must be provided as a directory on the admin server. For applications deployed in no-stage and external-stage modes, the new application source must also be distributed in advance to each node in the same path as it is on the admin server.

Staged Mode

As illustrated in FIG. 13, which illustrates the interaction between an admin node 620 and admin server 622, and a node 1 that includes a node manager 624 and two managed servers (here indicated as MS1 And MS2), in accordance with an embodiment of a staged mode, servers running applications in stage mode get their source directly from the admin server. In order to update the applications, the source must be updated on the admin server first, and then, while the server is in admin mode, a specific target redeploy will be called for each one individually in order to update its source and trigger it to pick up the changes properly. This operation groups servers on a common machine in a common cluster together for consistency.

No-Stage Mode

As shown in FIG. 14, which similarly illustrates the interaction between an admin node 630 and admin server 632, and a node 1 that includes a node manager 634 and two managed servers, in accordance with an embodiment of a no-stage mode, no-stage applications are loaded from a directory on the server's machine when the server is started. In order to update the application code here, all servers on that machine that are pointing to the same application directory must be shut down at the same time. Then the contents of the directory can be moved aside and replaced with the newer version of the application. Because the update is done by replacing the directory, the system may not support using a shared storage directory for no-stage applications, as this would cause problems for other servers still running applications out of the directory. The affected servers will then be started in admin mode, and a specific target redeploy command will be issued for each one individual so that it picks up the changes.

External-Stage Mode

As shown in FIG. 15, which similarly illustrates the interaction between an admin node 640 and admin server 642, and a node 1 that includes a node manager 644 and two managed servers, in accordance with an embodiment of an external staged mode, external-stage applications are similar to no-stage applications in that their application source needs to be updated by the workflow. The main difference however is that external-stage application source directories are located in the server's staging directory, and because of this, each server has its own copy of the directory to update. The workflow will shutdown servers on a common machine together, like the other stage modes, and then update the stage directory of each affected server before starting it in admin mode and using specific target redeploy to trigger the server to pick up the changes.

In order for the above processes to work, the replacement of the application code must be done only for servers as they are shut down. As such, any servers sharing the same application directory must be shut down at the same time. This precludes the servers from using a common shared storage location for the application directory. Each machine must have a local copy of the application directory, as well as a local copy of the new application directory. The path to the new application directory, current application directory, and the backup location must be the same for all affected servers. Also, the applications cannot reside in the Oracle Home directory.

Since changes to the application will be rolled out across servers in a staggered manner as the rollout proceeds, and while the servers are still servicing requests, it is possible that sessions that were created before the rollout started might not be compatible with the newer version of the application. This introduces some complication in how sessions are handled during the rollout and how the servers are shutdown, which can be addressed through the use of an isSessionCompatible flag in the commands that support updating the applications. If the sessions between the old version of the applications and the new version of the applications are compatible, certain safeguards will not be necessary and the rollout will complete more efficiently.

In accordance with an embodiment, three pieces of information are generally require from the user: the application name (used to look up more information in the config); the location of the new/patched application code (must be a local directory); and the location to which the current application directory will be backed up (must also be a local directory). The current application source location and stage mode can be calculated by the workflow based on the configuration of each server and its applications.

Even this reduced set of information can prove to be unwieldy to specify on the command line. To address this, in accordance with an embodiment, the information can be put into a text file by the user before issuing the command, in a location where the command can read it when it executes. The command-line argument for the respective commands is simply the path to this file.

In accordance with various embodiment, different formats can be used defining the file, a primary consideration being that the file needs to be human-friendly, since a human will be generating it. For example, JSON is an appropriate balance of human-readable, easy to organize, allows the user to use the same names for the properties of each application, and has the additional benefits of being commonly known and easy to parse.

Rolling Restart

In accordance with an embodiment, the zero downtime patching feature provides a mechanism for restarting a set of servers one at a time. Since there is no configuration change being done on the servers or Oracle Home or the domain directory, the servers will be brought down one at a time, even if there are multiple servers on the same machine running from a common Oracle Home directory. It is also because of this reason that if there is a failure in the workflow, the workflow will not be reverted, as there is no original state to restore to previously affected servers.

Monitoring Progress

In accordance with an embodiment, the WLST rollout command returns a WorkflowProgressMBean that can be queried to monitor the progress of the rollout task.

Rollout Implementation

In accordance with an embodiment, this feature introduces several high level operations or patching primitives in order to accomplish the rollout task. These operations will implement interfaces from the orchestration framework so they can be managed in a workflow. Patching primitives may be called by still higher level patching primitives. For example, a PatchNode primitive may call other primitives like ShutdownServer, and PrepareSwitchOracleHome, RestartNodeManager, AssertSwitchOracleHome, and StartServer.

In accordance with an embodiment, the rollout WLST call will use the PatchingFacadeMBean to create a workflow and pass it to a workflow lifecycle manager (e.g., WorkflowLifecycleManager) for execution. The Workflow will incorporate the primitives, e.g.: RolloutDirectory; CheckPrerequisites, which determines server groups that must be upgraded together (same cluster, same machine); and, for each server group: ShutdownServer (gracefully) for each server, PrepareSwitchOracleHome once for the node, RestartNodeManager once for the node, AssertSwitchOracleHome once for the node, and StartServer for each server.

In accordance with an embodiment, the PatchServer primitive is available to patch a single server at a time. However, since rolling out the Oracle Home will affect all of the servers on a node that share the directory, it is required to include all of the servers on each affected node. This is provided for use by other components, or to recover from a partial rollout. It will call the following primitives for the affected single servers: ShutdownServer (gracefully) for each server, PrepareSwitchOracleHome once for the node, RestartNodeManager once for the node, AssertSwitchOracleHome once, and StartServer for each server.

In accordance with an embodiment, the way the Oracle Home directory is replaced by the new image includes: 1. The servers are gracefully shutdown; 2. The prepareSwitchOracleHome primitive is called. This primitive tells the Node Manager for that node to setup a script that will do the switching of the Oracle Home directory. This step is how the Node Manager gets all the parameters that it requires to perform the operation; 3. The next step is to call the RestartNodeManager primitive. This will cause the Node Manager to transfer control over to the switchOracleHome script. That script will move the current Oracle Home to the directory path specified, extract the new image into the original location, and then start Node Manager again; 4. The next primitive to be executed is the AssertSwitchOracleHome primitive. This primitive will confirm that the switching of the Oracle Home directories was completed successfully; and 5. The last primitive called is StartServers. This is called for each server, and will not complete until the ReadyAppCheck returns successfully (if it is configured). This will ensure that all the applications can service requests before the workflow will shutdown any more servers.

Error and Failure Handling

One of the advantages of using an orchestration framework for coordinating the rolling restarts to update the Oracle Home directories is that the process can involve many steps and can take several hours. Manually performing the required steps would be tedious and time-consuming and thus prone to errors and inefficiencies. Automating the process reduces the opportunities for human error to be introduced, it makes more efficient use of the time required to perform the process, it provides several failure handling options, and in the worst case it can automatically revert all of its changes back to their original state.

In accordance with an embodiment, when executing a primitive that is made up of multiple commands (or other primitives) there are a few ways a failure can be handled. A failure on an individual command can be ignored or retried according to the setting used to construct the primitive. Each primitive that has a logical revert operation (like moving a file back to its original location after moving it to a new location) can also define the revert behavior using a CommandRevertInterface. When an unrecoverable error is encountered (one which prevents the successful completion of the rollout operation and does not succeed after retry), the completed steps will be reverted in the reverse order in which they were completed. If an additional failure is encountered during this revert phase, the revert process will stop, and the issue will need to be resolved manually by an operator.

In accordance with an embodiment, a user can also specify that a workflow should not revert automatically in the case of a failure, which provides the user with an opportunity to rectify the issue that prevented the workflow from proceeding. If the user is able to do this, the user can then call the execute method on the stopped workflow and it will move forward from its last successfully completed command. If the user is not able to clear the error that caused the workflow to fail, the user can call revert on the stopped workflow in order to cause the workflow to revert, starting with its last successfully completed command. A workflow can also be stopped by calling cancel on it, or by encountering an unrecoverable error during revert.

Rollback

In some situations, it may be the case that a patched version of the Oracle Home is successfully rolled out to all the servers in a domain, but after running with the patched version a problem with the patch itself is discovered. In this case, it may be desirable to rollback the update and move all the servers back to the previous version. In accordance with an embodiment, this operation can be achieved by re-running the rollout process, but using the earlier version as the target version. In order to ensure that the admin server is always at the highest patch level, this should be done by rolling out the previous patch to the cluster first, and then to the admin server individually. There are some potential issues with rolling back the version; for example configuration information for features introduced in the newer version could be lost, and undoing schema changes could a loss of transaction data.

Patching Facades

In accordance with an embodiment, the system can provide both a patching facade (as a POJO) and a PatchingFacadeMBean. The MBean version acts as a pass-through to the non-MBean version, but will return progress objects as MBeans instead of pojo's. The methods in the facade encapsulate the knowledge of the orchestration framework, including taking care of calling the appropriate methods in the PatchingWorkflowBuilder to create the WorkflowBuilder to pass into the WorkflowLifecycleManager. A method can be provided for each of the exposed patching primitives to enable other components to call them directly, together with high level calls that will create WorkflowBuilders to combine several of the primitives. Methods can also be provided to allow querying the list of active and completed workflows, and to look up progress for a workflow by the workflow's name. A workflow is assigned a name by the caller when it is started, which must be unique, as it can be used to identify the workflow to query its progress.

Patching Primitive

In accordance with an embodiment, patching primitives are operations needed to gracefully perform the rolling restarts needed by the out-of-place patching solution. Below is a list of each primitive, and explanation of what it does, which fault tolerance mechanisms it supports, and the attributes it requires.

Support for retry—this is true if the primitive has behavior that should be tried again if it fails the first time. This could be used for a primitive that depends on the state of another object that might be transitioning, like a service coming up, or to handle intermittent failures like an unreliable connection.

Support for revert—this is true if the primitive has a logical 'undo' operation that can be performed in the event that the workflow it belongs to is being reverted. If a primitive defines any special behavior for the revert case, it will be described here.

Customized resume—a workflow can be resumed after it has paused due to an admin server restart. There is an interface that allows a primitive the opportunity to override the standard resume functionality, maybe to recheck some prerequisites to make sure they still hold true. If a primitive defines any special behavior for the resume case, it will be described here.

Ignore failures—this will be true for a primitive that is executed as part of a workflow, but should not cause the workflow to revert if the primitive does not complete successfully. This might be used by a primitive that attempts an operation that is not critical to the success of the workflow.

In accordance with an embodiment, each primitive also checks a field called isDryRun. If the isDryRun field is set to true, the primitive will log the work it would have performed without actually performing it. It may also perform some consistency checks, but some consistency checks may not be applicable in this mode. For example, the StartServer primitive cannot expect that the StopServer primitive actually shutdown the server, so it will not perform the check to make sure the server is down.

In accordance with an embodiment, in order to assist administrators in diagnosing any error that may occur, and reviewing which primitives were run against which nodes and servers, each primitive is required to output at least one log message to the server log indicating the workflow id of the top level workflow, the type of primitive being executed, and the affected targets, along with any other pertinent information.

Exemplary Patching Primitives

In accordance with an embodiment, described below are exemplary patching primitives which can be used to roll out upgrades or patches. In accordance with other embodiments, different and/or additional patching primitives can be supported.

ShutdownServer

In accordance with an embodiment, this primitive gracefully shuts down the specified managed server. This is generally a long running process where the managed server transitions from "RUNNING" to "SHUTDOWN" state while allowing work in process to be handled gracefully. The primitive basically relies on the graceful shutdown feature in WLS. Before actually shutting down the server, the primitive will get the current state of the server (whether it is RUNNING, SHUTDOWN, ADMIN, or STANDBY) and update the shared state attribute called lastServerState. This will be used by the StartServer primitive, to determine if the server should be started at all. If the server was stopped when the ShutdownServer primitive was executed, the StartServer primitive will not start it.

Parameters

Parameters to the primitives are passed by name, as are any shared state objects. Here is a table of parameters and shared state objects by name.

| | |
|---|---|
| serverName | Name of the server that needs to be shutdown |
| ignoreSessions | Drop sessions immediately rather than waiting for them to complete or timeout. This parameter need not be specified if the server has already been quiesced |
| shutdownTimeout | Time limit (in seconds) for server to complete a graceful shutdown. The default is 0 indicating no timeout. |
| lastServerState | Stores the state of the server before it was shutdown, to be used by the StartServer primitive. Possible values are RUNNING, SHUTDOWN, ADMIN, or STANDBY |
| isDryRun | True if no work should be done, but the primitive should log what it would have done |

Fault Tolerance support

| | |
|---|---|
| Support for retry | Supports retry |
| Support for revert | Supports revert. The revert operation will invoke the StartServer primitive/command. |
| Customized resume | No custom behaviour |
| Ignore failures | No |

UpdateOracleHomeDirectory

In accordance with an embodiment, this primitive performs the work of updating the Oracle Home Directory to the contents of the new directory. Any processes that are running from the current Oracle Home location should first be shutdown. The node manager will hand control over to an external script that will restart it from the new directory once it is in place.

Parameters

Parameters to the primitives are passed by name, as are any shared state objects. Here is a table of parameters and shared state objects by name.

| | |
|---|---|
| newDirectory | The new image to rollout. This can be an expanded directory, or an archived directory created with the FMW movement script copyBinary |
| backupDirectory | The path where the current Oracle Home directory will be reassigned in case it is needed for revert or for a rollback in the future. |
| machineName | The name of the machine where the directory will be updated. |
| timeoutMilliseconds | The length of time to allow the UpdateOracleHomeLink script to execute before we timeout and report an error |
| isDryRun | True if no work should be done, but the primitive should log what it would have done |

Fault Tolerance support

| | |
|---|---|
| Support for retry | Retry possible, simply call the script again |
| Support for revert | Revert changes the Oracle Home back to the original |
| Customized resume | No custom behavior |
| Ignore failures | No |

PrepareSwitchOracleHome

In accordance with an embodiment, this primitive gives the node manager the parameters it needs in order to set up the script that will be used to replace the Oracle Home directory and restart the node manager.

Parameters

Parameters to the primitives are passed by name, as are any shared state objects. Here is a table of parameters and shared state objects by name.

| | |
|---|---|
| MachineName | Name of MachineMBean where node manager runs |
| newDirectory | The new image to rollout. This can be an expanded directory, or an archived directory created with the FMW movement script copyBinary |
| backupDirectory | The path where the current Oracle Home directory will be reassigned in case it is needed for revert or for a rollback in the future. |
| timeoutMillis | How long to wait for the client to reconnect to the node manager after it restarts. Timeout exceeded will consider the task failed and the node manager not reachable. Default is 3 minutes. |
| isDryRun | True if no work should be done, but the primitive should log what it would have done |

Fault Tolerance support

| | |
|---|---|
| Support for retry | None |
| Support for revert | The revert behavior is the same as the execute behavior of the AssertSwitchOracleHome |
| Customized resume | No custom behavior |
| Ignore failures | No |

AssertSwitchOracleHome

In accordance with an embodiment, this primitive is used after the node manager restarts to confirm that the Oracle Home was updated successfully. It returns true if the update was successful, otherwise it will fail.

Parameters

Parameters to the primitives are passed by name, as are any shared state objects. Here is a table of parameters and shared state objects by name.

| | |
|---|---|
| MachineName | Name of MachineMBean where node manager runs |
| newDirectory | The new image to rollout. This can be an expanded directory, or an archived directory created with the FMW movement script copyBinary |
| backupDirectory | The path where the current Oracle Home directory will be reassigned in case it is needed for revert or for a rollback in the future. |
| timeoutMilliseconds | How long to wait for the client to reconnect to the node manager after it restarts. Timeout exceeded will consider the task failed and the node manager not reachable. Default is 3 minutes. |
| isDryRun | True if no work should be done, but the primitive should log what it would have done |

Fault Tolerance support

| | |
|---|---|
| Support for retry | None |
| Support for revert | The revert behavior is the same as the execute behavior of PrepareSwitchOracleHome |
| Customized resume | No custom behavior |
| Ignore failures | No |

StartServer

In accordance with an embodiment, this primitive starts the managed server (using the new path location). A server can be configured to start in STANDBY, ADMIN or RUNNING mode as documented here. This information is persisted in the configuration and is used the next time the server is (re)started. When a server is started through this primitive, it will automatically transition to whichever mode it is configured to be started. Default server startup state is RUNNING.

In accordance with an embodiment, this primitive will also check the value of the lastServerState shared attribute to see if the server was already in SHUTDOWN state when the ShutdownServer primitive was called. If so, the StartServer primitive will not start the server because we want to preserve the original state.

Parameters

Parameters to the primitives are passed by name, as are any shared state objects. Here is a table of parameters and shared state objects by name.

| | |
|---|---|
| serverName | Name of managed server to be started |
| lastServerState | Contains the state of the server before it was shutdown. If the server was SHUTDOWN before the ShutdownServer primitive was executed, the StartServer primitive will not start it. Possible values are RUNNING, SHUTDOWN, ADMIN, or STANDBY |
| isDryRun | True if no work should be done, but the primitive should log what it would have done |

Fault Tolerance support

| | |
|---|---|
| Support for retry | This primitive does not support retry. It uses Node manager to start the server, and Node Manager already has retry logic built into it. |
| Support for revert | Supports revert which will invoke the ShutdownServer primitive |
| Customized resume | No custom behaviour |
| Ignore failures | No |

RestartNodeManager

In accordance with an embodiment, this primitive will restart the node manager. The Java based node manager process will exit with a specific return code that is recognized by the startNodeManager script. On seeing this return code, the startNodeManager script will kick off the updateOracle Home script. That script resides in the domain directory, and is be responsible for moving the current Oracle Home directory to the specified backup location, and moving the new Oracle Home directory into place (using pasteBinary if the new directory is an archive instead of a directory). Then it will start the node manager from the new Oracle Home directory. If the updateOracleHome script encounters an error extracting the archive or moving the new directory into place, it will move the original directory back into place and starting the node manager.

Parameters

Parameters to the primitives are passed by name, as are any shared state objects. Here is a table of parameters and shared state objects by name.

| | |
|---|---|
| MachineName | Name of MachineMBean where node manager runs |
| NMRestartTimeoutMilliseconds | Optional. How long to wait for the client to reconnect to the node manager after it restarts. Timeout exceeded will consider the task failed and the node manager not reachable. Default is 3 minutes. |
| isDryRun | True if no work should be done, but the primitive should log what it would have done |

Fault Tolerance support

| | |
|---|---|
| Support for retry | If the node manager is still reachable then we may retry. If not then no retry option |
| Support for revert | Revert will restart the node manager again. |
| Customized resume | No custom behavior |
| Ignore failures | No |

ExecScript

In accordance with an embodiment, this primitive runs a custom script from the domain/bin/patching directory on the specified machine.

Parameters

Parameters to the primitives are passed by name, as are any shared state objects. Here is a table of parameters and shared state objects by name.

| | |
|---|---|
| MachineName | Name of MachineMBean where the node manager runs. |
| ScriptName | Name of script to run. |
| ScriptEnv | Some Map of values we can pass as optional script env. |
| ScriptOutputLocation | Where to write script output, i.e., logging or file or other. |
| ScriptExecutionTimeout | Milliseconds to wait for script exec to complete. Once the specified time has elapsed the script process is halted and the node manager returns the error denoting the timeout. Default is 0 where we block until completion. |
| isDryRun | True if no work should be done, but the primitive should log what it would have done. |

Fault Tolerance support

| | |
|---|---|
| Support for retry | We can retry |
| Support for revert | Revert could be supported by someone overriding revert method to specify how the revert would work with that particular Workflow/Primitive |
| Customized resume | No custom behavior |
| Ignore failures | No |

UpdateNodeDirectory

In accordance with an embodiment, this primitive calls all the primitives required to update the Oracle Home directory for an individual node. It will call ShutdownServer, UpdateOracleHomeDirectory, PrepareSwitchOracleHome, AssertSwitchOracleHome, RestartNodeManager, StartServer.

Parameters

Parameters to the primitives are passed by name, as are any shared state objects. Here is a table of parameters and shared state objects by name.

| | |
|---|---|
| machineName | The name of the node to update. |
| rolloutMode | The mode of the rollout, either DOMAIN, CLUSTER, or SERVER |
| domainName | The name of the domain to affect. |
| clusterName | The name of the cluster to affect. |
| serverNames | The names of the servers to update. |
| isDryRun | True if no work should be done, but the primitive should log what it would have done |

Fault Tolerance support

| | |
|---|---|
| Support for retry | this primitive will not support retry itself, but some of the primitives it calls may |
| Support for revert | the revert method for this primitive will call revert for all of the primitives that were run as part of this primitive |
| Customized resume | No custom behavior |
| Ignore failures | No |

RolloutDirectory

In accordance with an embodiment, this is the main, top level primitive for rolling out Oracle Home updates across a domain or cluster. It coordinates all the other primitives to make sure the rollout is successful. It will take into account the rollout mode to determine which servers to update, and make sure the servers and node managers are updated in the right sequence. It will call checkPrerequisites as a first step in an attempt to quickly find any configuration issues that may prevent it from succeeding. It will then call UpdateNode for each node in the correct order.

Parameters

Parameters to the primitives are passed by name, as are any shared state objects. Here is a table of parameters and shared state objects by name.

| | |
|---|---|
| newDirectory | The new image to rollout. This can be an expanded directory, or an archived directory created with the FMW movement script copyBinary |
| backupDirectory | The path where the current Oracle Home directory will be reassigned in case it is needed for revert or for a rollback in the future. |
| rolloutMode | The mode of the rollout, either DOMAIN, CLUSTER, or SERVER |
| machineName | The name of the node to update. |
| domainName | The name of the domain to affect. |
| clusterName | The name of the cluster to affect. |
| serverNames | The names of the servers to update. |
| isDryRun | True if no work should be done, but the primitive should log what it would have done |

Fault Tolerance support

| | |
|---|---|
| Support for retry | this primitive will not support retry itself, but some of the primitives it calls may |
| Support for revert | the revert method for this primitive will call revert for all of the primitives that were run as part of this primitive |
| Customized resume | resume functionality will be default |
| Ignore failures | No |

Symbolic Links

In a typical system, there may be any places in the domain where the location of the Oracle Home is referenced. This includes variables in start scripts, properties files, and xml configuration files. In accordance with an embodiment, using a symbolic link in the path to the Oracle Home directory allows the system to update the location of the Oracle Home by simply changing the symbolic link. This way the system does not need to track and update every file that references the path when it changes. On each node the shared storage containing the Oracle Home is mounted at a level that potentially exposes multiple application server, e.g., WLS, versions installed in a common directory on the shared storage device. This way new Oracle Home directories can be created and patched and will be available without having to change the mount points on any of the nodes. The symlink is created to point through the mount directory to a specific version of the application server.

Home on Shared Storage

In accordance with an embodiment, in order to minimize the number of directories that must be cloned and patched as a precursor to running the rollout orchestration task, it is recommended that Oracle Home be located on a shared storage device accessible by all of the servers that will be patched. That way, a single duplicate can be made and patched, and all of the servers can mount the same storage point. It is recommended that the provided storage have some redundancy configured, so that it does not become a single point of failure for all the servers. It is also required that all of the servers mount the shared storage image using the same path, so that the symbolic link for each server can be updated in the same way.

Servers in a Cluster on Separate Machines

As described above, in accordance with an embodiment, a factor to maintaining uptime while upgrading the servers is taking advantage of high availability configured with clusters. In accordance with an embodiment, a minimum number of servers within a cluster must remain operational at all times. Since servers within a cluster on the same machine will need to be restarted together (if they share a common domain directory and symlink), the servers within a cluster should be hosted on at least 2 different physical machines, but a minimum of 3 machines per cluster is recommended. This will allow some to stay up and provide service, while the others are brought down as part of the rolling restart. When determining the number of servers available on different machines to handle the requests, it is important to exclude managed servers that are running but are in either Admin or Standby mode, as these servers will not respond to requests.

Admin Server Separation

The rollout process can be greatly complicated if an admin server and a managed server need to be updated at the same time. For example, this would be the case if an admin server and a managed server were configured to run on the same machine and share the same domain directory. The admin server would need to be brought down at the same time as the managed servers since it would be running from a shared symbolic link. This restriction can be addressed by isolating managed servers' installation homes to allow for rolling out patches on a per managed server basis. In accordance with an embodiment, two different configurations are supported that simplify this issue:

The first is to have the admin server running on a machine without any managed servers running on it. This allows the admin server to be updated in a step by itself, and once that is complete, the next step will be to update the managed servers in that domain on different machines.

The second configuration is to allow the admin server to run on the same machine as a managed server, but to make it run out of its own separate domain directory. This would again allow the admin server to be updated individually, and the managed servers could be updated in their own step.

Cluster-Level Patching

In accordance with an embodiment, in addition to providing a mechanism that will update all the servers in a domain, the system can provide the ability to update individual clusters within a domain. When the user is attempting to use the cluster rollout mode, if there are multiple managed servers on a single node serving different clusters, the managed servers must have separate domain directories according to the cluster they are serving. This is required so that all of the managed servers on a node for a cluster can be brought down and have their symlink updated without affecting the symlink of the managed servers that are serving the other cluster (and are still running).

Rollout Modes

In accordance with an embodiment, the rollout comprises gracefully shutting down a server, changing its Oracle Home symlink, and starting it up again. This can be applied to an entire domain, a single cluster within a domain, or individual servers. For any of these modes, if there are multiple servers being updated on a single machine that share a common Oracle Home, they will be shutdown and updated together. Also, when a server's Oracle Home is updated, its associated node manager will be restarted to pick up the changes. There may be cases where this is not strictly necessary, but doing it consistently simplifies the process and only results in a short window of time where the node manager is not responsive.

In accordance with an embodiment, the domain mode rollout will update the admin server and all the managed servers in the domain, along with all their associated node managers. It is important that the admin server is always running at the highest patch level of any of its managed servers. In order to ensure this requirement is met during the domain mode rollout, the admin server will always be updated before the managed servers.

In accordance with an embodiment, the cluster mode rollout will not update the admin server, it will update all of the managed servers in the cluster and their associated node managers.

In accordance with an embodiment, the server mode rollout will affect the servers specified in the target parameter. It will also update the node managers associated with those servers.

Rollout WLST Command

In accordance with an embodiment, the rollout task is responsible for figuring out which servers need to be updated, in which order, and for creating a workflow that will update them safely. This includes quiescing the node, gracefully shutting down the server, updating the Oracle Home link, restarting the Node Manager, starting the server, and gracefully activating the node. The rollout task takes a name that it will register with a workflow lifecycle manager (e.g., WorkflowLifeCycleManager, LCM), so that the result MBean can be accessed at a later time or by another WLST connection. The rollout task will return a WorkflowProgressMBean that can be polled for status. Some examples are provided below:
Perform a rollout across a domain:
>progress=rollout('DomainlRollout', /opt/OracleHome, /mnt/wls1214.01)
Perform a rollout across a cluster:

```
> progress = rollout('Cluster1Rollout', /opt/OracleHome, /mnt/
  wls1214.01, 'Cluster', 'Cluster1')
```

Perform a rollout to two specific servers:

```
> progress = rollout('MSRollout', /opt/OracleHome, /mnt/wls1214.01,
'Server', 'managedServer1, managedServer2')
```

Perform a dry run or a rollout across a domain without OTD configured:

```
> progress = rollout('Domain1Rollout', /opt/OracleHome,
/mnt/wls1214.01, 'Domain', 'Domain1','isDryRun=true, useOTD=false')
```

In accordance with an embodiment, the WLST rollout command returns a WorkflowProgressMBean that can be queried to monitor the progress of the rollout task. This information is available for a WLST session that needs to reconnect and also remains available after the Workflow has completed.

Node Manager

In accordance with an embodiment, the automatic patch rollout solution needs a mechanism to update environments on remote machines. In accordance with an embodiment, the orchestration framework can execute from the admin server and delegate to the node manager on each machine to carry out tasks such as updating the Oracle Home, and restarting processes in order to uptake the new binaries.

In accordance with an embodiment, the node manager will serve as the mechanism to execute a custom patching script on a remote machine to change the symbolic link to Oracle Home. A script can be executed once per machine per domain. The node manager supports an internally used API to allow basic script execution during automated service migration, which can be leveraged to support the patching features described above.

In accordance with an embodiment, the symbolic link will be switched while the node manager is running, however, the startNodeManager scripts will be set up to run out of the actual directory rather than always using the symbolic link. The symbolic link will only be used for restarting the node manager so that it will be able to uptake patched binaries. The parent start script, either in the domain or in a node manager Home outside of Oracle Home, will execute the base startNodeManager script using the symbolic link location. The base script is installed with WL_HOME set to the real directory and all environment values are generated using that value. The result is that while the domain runs from the symbolic link location, the node manager will only run from the real directory and thus will not be impacted when the symbolic link is switched.

In accordance with an embodiment, system components running from the node manager will have options to ensure that their processes can support patching.

First, if they make use of the node manager environment to start their processes they will be insulated from the symbolic link change and will be consistent with the node manager version. This means they would be able to keep their component running while the symbolic link is changed and only restart after the node manager is restarted in order to pick up the new Oracle Home location.

Second, if they wish to make use of the symbolic link more directly they will either need to get that value from the domain itself through some start script like WLS uses, or from the node manager environment as a defined value such as, LINK_MW_HOME, and will need to ensure their process is appropriately shutdown prior to the symbolic link change. Yet another option is to allow them to supply their own path information and manage it directly. For example, an OHS install passes an "ohs.home" to the node manager in the JAVA_OPTIONS environment flag. This value can be a symbolic link managed during patching by providing its own patching primitive controlling when the path is changed and when the processes are restarted.

In accordance with an embodiment, as part of automatic rollout patching, the node manager can be restarted so that it runs off from the new (patched) WebLogic Server image, by issuing, e.g., a "RESTART" command to the node manager. The node manager can also be started in others ways, such as a user-supplied script that specifies different options. An approach is to rely on a base startNodeManager script to capture an internal exit code and then execute the startNodeManager script found at the symbolic link location. For example an incoming RESTART command will exit the JVM with a code of 88. The script will see 88 and will attempt to start another instance using the new script in order to pick up any changes to the script itself. This will not pick up any changes to the domain level or other wrapper scripts, only to the base startNodeManager script under WL_HOME/server/bin. This is accomplished by executing the SCRIPTPATH that was used by the parent script, which in this particular topology will be the symbolic link.

In accordance with an embodiment, in the automatic patch rollout solution, the rollout command will shutdown all the managed servers, execute a custom patching script via node manager, start all the managed servers, and restart the node manager. The node manager itself passes on its own environment by getting system properties through the System.getenv( ) API and/or using the ProcessBuilder.environment( ) API and providing these values along with configured values to the new process when it is created.

In accordance with an embodiment, when a domain has its own unique symbolic link to the Oracle Home directory that can be swapped while the node manager maintains its original view of the Oracle Home directory. In such a topology, the node manager will pass on CLASSPATH and other values which would give the managed server pointers to binaries from the incorrect version. This can be addressed by only passing on environment values that are not specific to WebLogic Server and the Oracle Home.

In accordance with an embodiment, in both the per-domain node manager and the per-machine node manager the NodeManagerHome directory is expected to be located outside of the Oracle Home directory. By default the per-domain node manager's NodeManagerHome directory is a sub directory under the domain directory.

NodeManager Restart

In accordance with an embodiment, the system can provide an automated capability to restart the Java based node manager process.

Java Based Node Manager

In accordance with an embodiment, the Java based node manager will accept a new command "RESTART" that is issued from the NMClient. When the NMServer receives the restart command, it will exit with a specific exit code, 88. Any graceful shutdown action should also be taken, but the managed processes started by the node manager should remain running. The NMClient API proposed:

```
/**
* Issue the RESTART command to the NMServer
* @param timeoutMillis the amount of time to wait for theNodeManager
* process to be restarted and reachable before throwing anIO Exception
* a value of 0 will return without blocking. Values must bepositive.
*/
public void restart(long timeoutMillis) throws IO Exception;
``` startNodeManager script

In accordance with an embodiment, the supplied startNodeManager scripts will check for the specific code, 88, when the Java node manager is no longer running. When 88 is the returned code, then the script will launch the new startNodeManager script that is found at the symbolic link location. All new patch files including binaries and scripts will be located in a separate location and will be available using the symbolic link. This means that none of the files should ever be overwritten. The restart scenario would be scripted something like the following example, where $WL_HOME points to the symbolic link location:

```
"${JAVA_HOME}/bin/java" ${JAVA_PROPERTIES}
weblogic.NodeManager
if [ $? -eq 88 ]; then
  exec ${SCRIPT_PATH}/startNodeManager.sh
fi
```

In accordance with an embodiment, many of the different methods that start the node manager process can make use of a base startNodeManager script contained in the WL_HOME/server/bin directory. The domain level script in domain/bin and custom wrappers should delegate to this script and as a result use the same logic for launching, and the WLST startNodeManager command can use those scripts as well.

Figure 16:
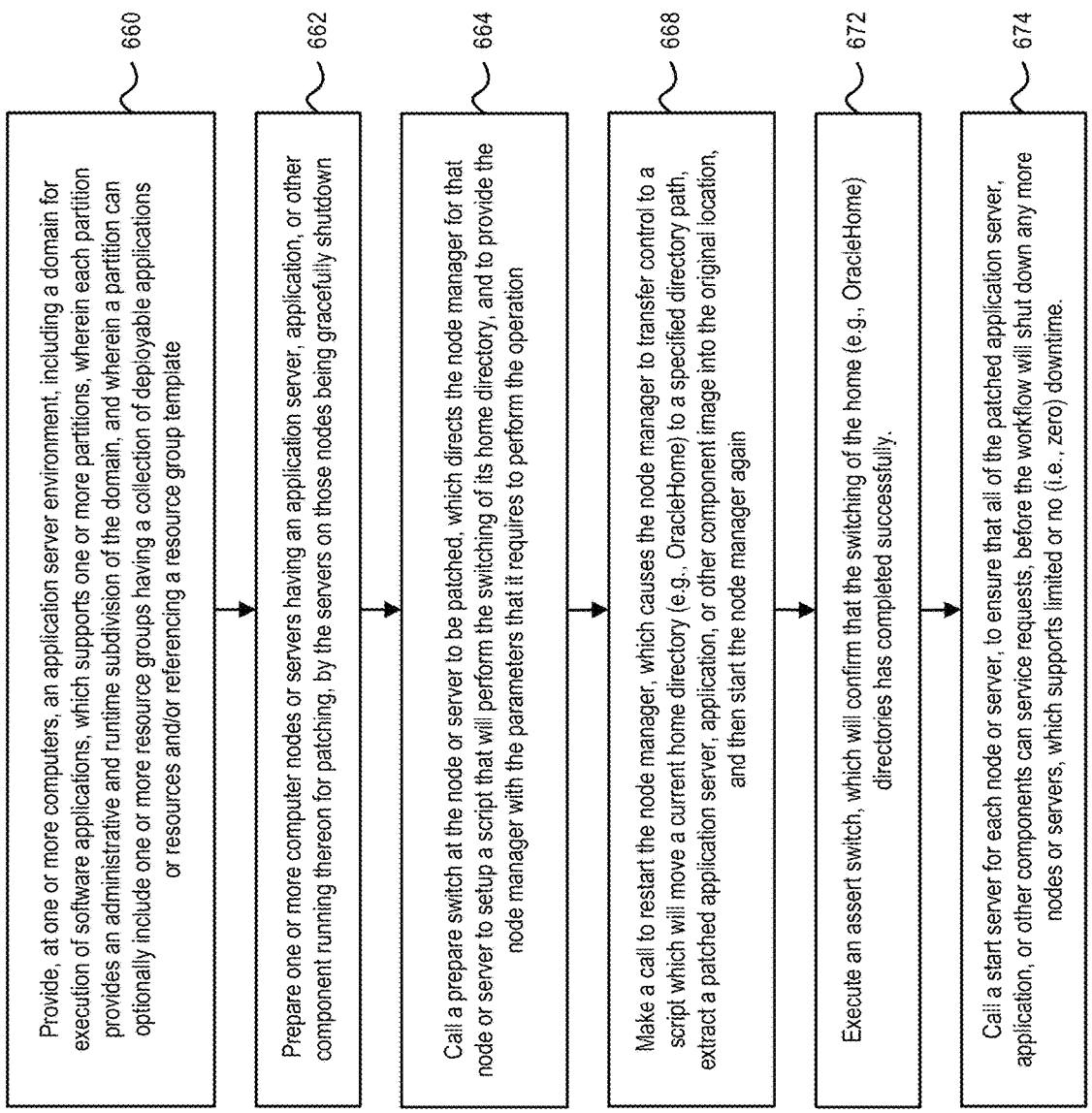
FIG. 16 illustrates a flowchart of a method for patching, in accordance with an embodiment.

FIG. 16 illustrates a flowchart of a method for patching, in accordance with an embodiment.

As illustrated in FIG. 16, at step 660, an application server environment is provided at one or more computers, including a domain for execution of software applications, which supports one or more partitions, wherein each partition provides an administrative and runtime subdivision of the domain, and wherein a partition can optionally include one or more resource groups having a collection of deployable applications or resources and/or referencing a resource group template.

At step 662, one or more computer nodes or servers having an application server, application, or other component running thereon are prepared for patching, by the servers on those nodes being gracefully shutdown.

At 664, a prepare switch is called at the node or server to be patched, which directs the node manager for that node or server to setup a script that will perform the switching of its home directory, and to provide the node manager with the parameters that it requires to perform the operation.

At step 668, a call is made to restart the node manager, which causes the node manager to transfer control to a script which will move a current home directory (e.g., Oracle Home) to a specified directory path, extract a patched application server, application, or other component image into the original location, and then start the node manager again.

At step 672, an assert switch is executed, which will confirm that the switching of the home (e.g., Oracle Home) directories has completed successfully.

At step 674, a start server is called for each node or server, to ensure that all of the patched application server, application, or other components can service requests, before the workflow will shut down any more nodes or servers, which supports limited or no (i.e., zero) downtime.

Session Replication During Zero Downtime Patching

In accordance with an embodiment, during zero downtime patching, it is important to protect against session loss in order to ensure "zero downtime". This means accounting for session replication and failover during the rolling patching process, as well as session compatibility concerns due to application patching.

In a typical application server (e.g., WLS) environment, the system generally tries to ensure that a session will be available somewhere in the cluster as long as only a single member of the cluster goes down during the time between user requests. If the primary server crashes and then the secondary server crashes, the session would be lost. Session replication distribution is not even throughout the cluster, since all sessions from a primary server are replicated to a single secondary server. However, request failover is evenly distributed. This means that as a group of requests are failing over to another server an even portion will land on the secondary server, and each of the remaining servers across the cluster. Each server will then be responsible for that portion of requests that have been received. Servers that did not have a copy of the session will have to fetch the session and then will use their own secondary selection algorithm to decide where to keep a backup copy. The old, or orphaned, copy is left in place until it is timed out. The end result is that the even distribution of requests will ensure that the sessions in memory are also somewhat evenly distributed, even though the replication algorithm is not.

Asynchronous Replication has distinct windows where the request has completed but the session changes have not been replicated. This window of time also means that there can be stale sessions served whenever the request either fails over due to server crash or is routed incorrectly from the front end. In accordance with an embodiment, the algorithm for finding a session object for a particular session id is: 1. Check the local maps for the session ROID and use it when found. 2. Check the JVMIDs in the client cookie to try getting the session from the primary server or the secondary server. 3. When available, get the session from that server, become the primary and replicate to our preferred secondary server. 4. The session from the original primary/secondary will become orphaned and will only be cleaned up on invalidation or timeout. 5. If the session is not available from above, then return a new session This means that there is the possibility for using a local copy of a session, although the cookie may point to a valid primary or secondary server. This would happen when a failover occurs and a server other than the secondary serves the request. The original secondary has a stale copy and if another fail over occurs to that server then the stale copy will be found and used before any other copy.

The secondary selection for each server will either attempt to choose a secondary automatically or based on the configured values of preferred candidate servers, remote candidate servers, and local candidate servers. Without extra configuration the automatic selection will select a server from another machine based on a modulo operation of the index of the current server in the full server list and the size of the remote server list. When each machine contains a single server and each machine is organized in similar order to the servers this results in each server replicating to the next in the list, server1 to server2, server2 to server3, server3 to server4 and so on until the last server in the list replicates to server1. When a front end server cannot maintain affinity to the primary server due to shutdown, it will randomly redirect the requests in even distribution among the remaining clustered servers.

During zero downtime patching it is possible to roll out a patched Oracle Home that contains upper layer applications or even roll out specific application patches independently of Oracle Home patches. When those applications contain changes the system must protect against the possibility of session incompatibility. A common scenario for a session incompatibility arises with the use of application frameworks. Updating an application with a new version of such a framework will result in a lack of control over the classes contained in the classpath. One patched version of the application session may contain class "patched.Foo" in the session whereas the previous version of the application session may contain class "unpatched.Bar". When a request triggers an attempt to replicate the session, the serialization would occur on a patched or unpatched server while the attempt to deserialize could occur on a server of the opposite state. Lacking the appropriate classes in the classpath, the server receiving the session would fail the deserialization process. This would result in the session not being replicated and a warning message printed in the log file. With the session only existing on a single server, it would be at risk of being lost to server shutdown or server crash.

When patching applications, the ability to replicate the session is important but equally so is the ability to ensure the session is successfully deserialized on some server in order to serve the request. After a server has been shutdown, the front end will fail over the request at random to one of the remaining members in the cluster in an even distribution. Once the server receives the request it will attempt to grab the session from a server that holds a copy of that session. When a patched or unpatched server attempts to load the session that originated from a server of the opposite state, an incompatible session would result in a deserialization error and the user would lose their session information. Such a scenario will often happen during the patch rollout process where a server is shutdown and then restarted with a patch while other members of the cluster handle the random failover request. This could be the case for any failover request as the cluster member will be chosen at random from the front end server. Also a slow or lazy client could send a request back to the same server after it has been patched. This will have the effect of the patched server attempting to load the "unpatched session" stored on some other server.

Zero downtime patching updates each node in a rolling fashion where server1 is shutdown, patched, and then restarted before continuing with the next node. As the process comes to the last server to be patched, there exists a group of sessions originating on unpatched servers that may only be compatible on the last server. If the last server is shutdown before these sessions are done (timeout or invalidation), then those sessions may not be loaded on any server and will be lost. However, if the sessions are compatible then they can be safely shutdown without waiting.

As zero downtime patching rolls through the cluster, the server being patched will be shutdown putting its primary sessions at risk. This is because when Server1 is shutdown, its primary copy of sessions are no longer available. If Server2 is hosting the secondary sessions they are elevated to primary status on Server2, but the sessions are not replicated to any other server in the cluster until another request comes in to update the session. Shortly after restarting Server1, Server2 can be shutdown as the next operation in the patching rollout. Any the client that does not send another request before Server2 is shutdown will lose its session information.

In accordance with an embodiment, to handle session incompatibility with minimal impact to existing replication services, the patching framework will connect to each server and temporarily enable an existing option to deserialize the session lazily, cluster wide session querying, along with new options to replicate sessions on shutdown and cleanup orphaned secondaries after fetching them. These options will combine to ensure that a session can be stored appropriately across the cluster and minimize session loss during patching.

In order to fully meet the goal of avoiding session loss, the system must ensure that a server that is able to load the session serves the request. In accordance with an embodiment, this will again be done with minimal disruption to existing session handling. The server will optimistically attempt to load the session and when it is unable to do so, it will communicate an appropriate list of servers to OTD using the 503 response code that should be able to handle the request.

In accordance with an embodiment, when shutting down a server to be patched, the session replication option will allow the server to automatically replicate any sessions necessary to ensure they are all available on a secondary server. When the patching framework is about to shutdown the last sever in the cluster, it will by default signal waitForAllSessions when shutting that server down. This will signal to the web container that all sessions must be handled before the server can finalize the shutdown. The user may optionally provide input to signal that all application patches have compatible session classes and thus waiting is not required for the last server in the cluster.

Lazy session deserialization is a performance based feature enabled on some systems, such as Exalogic platforms. A ReplicatedSessionData objects query the ClusterMBean to check whether LazySessionDeserialization is enabled prior to deciding whether to deserialize session attributes. When enabled the session attributes will be stored effectively as a byte array. That byte array will be automatically deserialized later when the attribute is retrieved.

In accordance with an embodiment, in order to take advantage of this capability to load the session only when necessary, the functionality can be made dynamic. The patching framework will have the responsibility to enable/disable lazy session deserialization during the patching process. Because this is also a configuration value, the framework will only attempt to change the setting if the ClusterMBean configuration has not enabled already. Otherwise, the ClusterService on each managed server will be used to receive runtime values that when enabled will take precedence over the configured values. This means the ClusterService can turn on LazyDeserialization even when it is off. But it cannot disable it when the user has configured it as on. Because this will be a runtime value, the patching framework will have to make multiple calls to the ClusterService. The first notification will occur before any servers in the cluster are patched. It will connect to each server in the cluster using the RemoteClusterServicesOperations interface in order to set LazySessionDeserialization on the ClusterService. The second notification will occur after a server has been patched and restarted. After the restart the server will again be using the configured value, so it will be necessary to reestablish the runtime setting to enable LazySessionDeserialization. When patching process is complete, the patching framework will disable the lazy session deserialization option as necessary.

In accordance with an embodiment, the patching framework will alert each member of the cluster about the current state of servers, in the format of a pair of lists of servers. One List of server names will be considered a grouping, and the other List of server names will be considered the other group. There will again be two different point where notifications are necessary. The first notification will occur after shutting down a server and applying the patch. Prior to restarting that server the cluster will be notified with new groupings with the newly patched server joining the patched list. This will ensure the running servers do not have stale information as the patched server is restarted. The second notification will occur immediately after a server has been started, while the framework waits for all applications to become ready. The goal is to ensure the server gets notified of the state as soon as possible to ensure it can handle any requests involving session incompatibilities correctly. Finally, after the patching process is complete the values will be reset to null with a final notification to the cluster. This will restore the state before patching so the cluster will no longer assume that patching is under way so behavior can again return to the default.

In accordance with an embodiment, the web container will optimistically attempt to retrieve the replicated session. If there is a deserialization error that occurs, then the web container will check for the current server groups. The value of the current server groups will indicate whether patching is currently in progress. The web container will examine the contents of the groups to identify which group the current server is in. The group that does not contain the current server name will be considered the compatible group based on the logic that the current server is incompatible and thus the other group must be compatible. This should serve both forward and backward compatibility issues. Once the web container has identified the group of servers where the session is most likely compatible, it will return a 503 Response Code along with a "X-WebLogic-Cluster-FailoverGroup-List" header with a list of servers in that group.

In accordance with an embodiment, OTD will receive the 503 along with the header containing the server group and will randomly select servers from that list to redirect the request. OTD will be sure to handle servers in the drain pool as this is information that WLS does not have. The server-specified list will contain the current members in the cluster generated at runtime. This should be handled by the front end similarly to the dynamic discovery of WebLogic Servers joining the cluster. The list will be dynamic in nature and can change during runtime, however, the list will include all cluster members that are known at the start of the patching process.

In accordance with an embodiment, the patching framework will have the responsibility to enable the proper handling of sessions during patching. This replication of sessions during shutdown will depend on enabling both cluster wide session querying, and orphaned secondary cleanup. The framework will only attempt to change any setting if the ClusterMBean configuration has not enabled that setting. The framework will connect to each server prior to patching and will enable each flag. Then as each server is restarted the flags will again have to be set. Finally, after the patching process is complete the settings will be reverted as necessary.

In accordance with an embodiment, session fetching, which is already implemented for WLS-MT Clustering is used to automatically replicate a session to a secondary without updating the client cookie, so that a fail over request will land on any member of the cluster and we will need some mechanism to find the session. The behavior when a request lands on a server will be: Check the local maps for the session ROID and use it when found. 2 Check the JVMIDs in the client cookie to try getting the session from the primary server or the secondary server. 3 When available, get the session from that server, become the primary and replicate to our preferred secondary server. 4 A new mechanism will be introduced to deal with orphaned sessions on the original primary/secondary server. 5 If the session is not available from above, then: If SessionFetching is not enabled then return a new session. If SessionFetching is enabled then send a broadcast query to the cluster. The first response will be used to identify the server where we can get the session. We become the primary and replicate to our preferred secondary server. ii. A new mechanism will be introduced to deal with orphaned sessions on the original primary/secondary server.

In accordance with an embodiment, during server shutdown, immediately before notifying other cluster members of shutdown, the ReplicationService will ensure that each primary copy of the session is replicated to the secondary server. This will ensure that no session is lost during the shutdown operation of a server. This will only affect clients that have not made a request since the original primary has been restarted meaning they have not reestablished a new primary server with a new secondary server. Finally when such a client returns, the session will be available on some server in the cluster.

In accordance with an embodiment, Orphaned sessions are not unique to session replication on shutdown or session fetching. However, due to the iteration of the cluster where each server is restarted in succession this problem becomes more likely.

In order to deal with the probability of serving stale session data from an orphaned secondary, there will be a mechanism to cleanup the orphaned secondary copies after fetching. When this functionality is enabled during patching, the ReplicationService will trigger a background process that will handle the cleanup of orphaned sessions after fetching that session. The background process will know the session version number, timestamp information, where the session was found, any other servers that session may have been associated with, and the new secondary server. This will allow us to clean up all stale copies based on the version and timestamp information without removing the current copies of the session.

In accordance with an embodiment, when server is gracefully shutdown, the user may specify ignoreSessions=false to make web container wait for completion of sessions which are not replicated. But web container won't wait for replicated sessions because there's session replica somewhere in the cluster. But for ZDT patching, if the session is incompatible and the server is last unpatched server in the cluster, the server will be the only one which has compatible sessions and it must wait for all sessions to be completed. The "waitForAllSessions" flag for graceful shutdown is introduced for this purpose.

The patching framework will by default specify "waitForAllSessions" Boolean when calling shutdown on the last server in a cluster. This will signal to the web container to wait for all sessions to be invalidated prior to finishing the shutdown sequence. All requests without associated session will be rejected by 503 response, OTD will try other servers in the cluster to serve these requests if it get 503 response. All requests with existing sessions will be properly served. The web container must handle each of these sessions until completion as they may be incompatible on any of the patched servers.

The user may optionally specify Session- Compatibility= true when beginning the patching operation in order to signal that waitForAllSessions can be false. The waitForAllSessions option is added to the ServerLifeCycleRuntimeMBean similar to the existing ignoreSessions parameter. In accordance with various embodiments, additional parameters can be supported, for example a timeout (delayBetweenNodes) to indicate how long to wait before starting to shutdown a next managed server for patching; which can be useful in ensuring that secondary sessions are replicated before attempting to shut down the server.

Quick Start Example

In accordance with an embodiment, zero downtime patching can be achieved by rolling out changes to one node at a time, and allowing a traffic director (e.g., OTD) to redirect incoming traffic to remaining nodes until the change is complete. A typical sequence operations for the patching of an, e.g., Oracle Home includes: 1. An administrator validates the patch; 2. A copy of the Oracle Home and representative domain is created; 3. The patch is applied to the testing/validation environment; 4. Testing is conducted to ensure the patch is approved for production; 5. The validated Oracle Home is copied using a script, and the generated archive considered the patched "Gold Master" that will be rolled out across the production environment; 6. The generated Oracle Home archive is distributed to each physical machine across the production environment by the Administrator; and 7. The Administrator executes the rollout operation.

The installation/update of JavaHome, and the distribution of application sources, can be similarly left up to the administrator for those rollout operations. In accordance with an embodiment, the target environment must include three or more physical machines or nodes; including one node which will run an admin server. Additional requirements, in accordance with an embodiment, include that managed servers must be in a cluster to support zero downtime; each node must have its own node manager running, including the node running the admin server; the Oracle Home directory must be installed locally on each node, preferably in the same location on every node (e.g., /scratch/aime1/OracleHomes/wls1221); and the domain directory must be outside of the Oracle Home directory.

An administrator can avoid having to duplicate the install and the domain on every node by taking advantage of movement scripts to create an archive jar of the Oracle Home, and copying the archive jar to each remote node In accordance with an embodiment, the domain must reference at least two managed servers and at least three node managers. The domain can be duplicated for multiple nodes using pack/unpack utilities, including making a copy of the domain, distributing that binary to both of the remote nodes, and then performing an unpack on each remote node.

For the JavaHome rollout to be successful, the new JavaHome must be installed on each affected machine, and must be located at the same path on each machine. This must be done while the current node manager and managed servers are running, so the installation must not change the existing JavaHome path. To assist this, the JavaHome be specified as an absolute path, not as a path containing symlinks, Any changes to the Oracle Home will be applied one node at a time once the rollout operation is started. The Administrator can use OPatch tooling, as further described below to apply the desired patches. Some customers may have tools in place that can help with distribution of files, like Puppet or Chef.

Integration with OPatch

In accordance with an embodiment, the system can integrate with products such as OpatchAuto, to provide a customer-facing front end for zero downtime patching across a range of, e.g., Oracle products. Integrating these features provides a more complete solution under a single interface.

In accordance with an embodiment, OPatchAuto provide tooling that allows a user to create patched versions of, e.g., WLS components, to make them accessible to nodes that will be updated, and to invoke and monitor the patching rollout. The patching infrastructure manages the runtime states and availability of the servers, updates the WLS components and application sources, and addresses any multi-tenancy concerns while ensuring active sessions are preserved.

In some situations, a customer may want to separate the creation of the patched archives from the rollout in order to perform verification testing in a non-production environment, or they may want a single action that combines those parts. In accordance with an embodiment, OPatchAuto provides the ability to create a patched WLS archive, make the archive available to all nodes, and initiate the rollout, as separate or combined steps. The user can use OPatchAuto to create the patched binary that will be distributed to every node, stage the patched binary on every node, and perform the runtime activation of the patched binary without service downtime (leaving WLS to be responsible for runtime management and rollout).

In accordance with an embodiment, OpatchAuto acts as the entry point to drive zero downtime patching in a WLS environment, including providing the ability to inspect the patch metadata so the patching plan can decide whether ZDT Patching is supported for the topology, and providing the workflow capability of creating an offline patched environment for testing. This will include the ability to copy an existing Oracle Home either directly from the production environment or assumed to be equivalent to the production environment.

Additionally, OPatchAuto will provide the workflow capability of distributing a successfully patched and tested Oracle Home archive to the various nodes in the topology. This will leave the environment prepared for the rollout, which can be initiated with OPatchAuto at any time. OPatchAuto can also be used to initiate and monitor the patching rollouts.

The patching infrastructure is responsible determining the order in which the servers will be updated; monitoring the steps of the patching rollout and determining when to proceed and when to revert if necessary; ensuring sessions are preserved; managing the server lifecycles and swapping in the patched Oracle Home bits; provide its standard progress object to be queried by OPatchAuto for status updates; and enhance the progress object to provide information regarding which servers will be patched and which servers have been patched. This information will also be made available via the progress object before the rollout begins executing.

Example

An application server (e.g., WLS) Domain is created outside MW_HOME. OPatchAuto wallet is created to connect to the host via SSH/JMX:

```
-    . ./common.sh
-    ./config-wallet.sh -create "${USER}&${HOSTNAME}:ssh"
     "${USER}&${HOST1}:ssh" "${USER}&${HOST2}:ssh"
     "${USERNAME}&${HOSTNAME}:wls"
```

Apply patch to Admin Server and create an archive based off of the patched Oracle Home out-of-place:

```
-    ${ORACLE_HOME}/OPatch/auto/core/bin/opatchauto.sh apply
     ${PATCH_HOME} -create-image -image-location
     ${WLSZDT_DIR}/image.jar -oop [-oh
     /path/to/different/oraclehome]
```

After verification, stage the patched archive to all of the nodes that will be updated:

```
-    ${ORACLE_HOME}/OPatch/auto/core/bin/opatchauto.sh apply -plan
     wls-push-image -image-location ${WLSZDT_DIR}/image.jar -wls-
     admin-host ${HOSTNAME}:7001 -wls-target Cluster1 -remote-image-
     location ${WLSZDT_DIR}/rolloutOracleHomeImage.jar -wallet
     ${WALLET_DIR} [-walletPassword passswordIfNeeded]
```

Initiate and monitor the rollout to the whole domain or a particular cluster:

```
-    ${ORACLE_HOME}/OPatch/auto/core/bin/opatchauto.sh apply -plan
     wls-zdt-rollout -image-location ${WLSZDT_DIR}/image.jar -wls-
     admin-host ${HOSTNAME}:7001 -wls-target Cluster1 -backup-home
     ${WLSZDT_DIR}/home-backup -remote-image-location
     ${WLSZDT_DIR}/rolloutOracleHomeImage.jar -wallet
     ${WALLET_DIR}
     [-walletPassword passswordIfNeeded]
```

Resume or Rollback failed rollouts:

```
-    ${ORACLE_HOME}/OPatch/auto/core/bin/opatchauto.sh resume -
     session SEID [-walletPassword passswordIfNeeded]
-    ${ORACLE_HOME}/OPatch/auto/core/bin/opatchauto.sh rollback -
     session SEID [-walletPassword passswordIfNeeded]
```

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for patching in a multitenant application server environment, including support for session handling and incompatibility, comprising:
   a plurality of managed server instances that operate within an application server environment as part of a domain that includes a plurality of partitions, wherein each partition, of the plurality of partitions, provides a subdivision of the domain; and
   wherein a patching process updates the plurality of managed server instances while providing support for session handling and incompatibility, including, during rollout of a patch to the plurality of managed server instances,
      loading session data associated with a plurality of replicated sessions at particular managed server instances of the plurality of managed server instances,
      receiving a request associated with a particular session,
      attempting to load the particular session at a first managed server instance of the plurality of managed server instances associated with a first patch version, and
      if the first managed server instance of the plurality of managed server instances cannot load the particular session, due to an incompatibility in patch version, then directing the particular session to be loaded at a second managed server instance of the plurality of managed server instances associated with a second patch version.

2. The system of claim 1, wherein directing of requests associated with sessions, at particular managed server instances of the plurality of managed server instances, enables requests associated with particular versions of the application server environment, application, or other component, to be directed to managed server instances handling those particular versions of the application server environment, application, or other component.

3. The system of claim 1, further comprising, if the first managed server instance of the plurality of managed server instances cannot load the particular session, providing a response code to a traffic director indicative of one or more other managed server instances of the plurality of managed server instances that can load the particular session.

4. The system of claim 1, further comprising one or more resource groups, which include groupings of deployable resources for use by a partition within a domain, including that each partition, of the plurality of partitions, includes at least one resource group for use by that partition.

5. The system of claim 1, wherein the system is provided within a cloud environment and supports multiple tenants operating within the cloud environment, including that each particular partition, of the plurality of partitions, is associated with a particular tenant of the cloud environment.

6. The system of claim 1, wherein during the patching process, the plurality of managed server instances are configured to perform a lazy de-serialization of the session data associated with the plurality of replicated sessions at the particular managed server instances of the plurality of managed server instances.

7. A method for patching in a multitenant application server environment, including support for session handling and incompatibility, comprising:
providing a plurality of managed server instances that operate within an application server environment as part of a domain that includes a plurality of partitions, wherein each partition, of the plurality of partitions, provides a subdivision of the domain; and
updating, using a patching process, the plurality of managed server instances while providing support for session handling and incompatibility, including, during rollout of a patch to the plurality of managed server instances,
loading session data associated with a plurality of replicated sessions at particular managed server instances of the plurality of managed server instances,
receiving a request associated with a particular session,
attempting to load the particular session at a first managed server instance of the plurality of managed server instances associated with a first patch version, and
if the first managed server instance of the plurality of managed server instances cannot load the particular session, due to an incompatibility in patch version, then directing the particular session to be loaded at a second managed server instance of the plurality of managed server instances associated with a second patch version.

8. The method of claim 7, wherein directing of requests associated with sessions, at particular managed server instances of the plurality of managed server instances, enables requests associated with particular versions of the application server environment, application, or other component, to be directed to managed server instances handling those particular versions of the application server environment, application, or other component.

9. The method of claim 7, further comprising, if the first managed server instance of the plurality of managed server instances cannot load the particular session, providing a response code to a traffic director indicative of one or more other managed server instances of the plurality of managed server instances that can load the particular session.

10. The method of claim 7, further comprising one or more resource groups, which include groupings of deployable resources for use by a partition within a domain, including that each partition, of the plurality of partitions, includes at least one resource group for use by that partition.

11. The method of claim 7, wherein the patching process is provided within a cloud environment and supports multiple tenants operating within the cloud environment, including that each particular partition, of the plurality of partitions, is associated with a particular tenant of the cloud environment.

12. The method of claim 7, wherein during the patching process, the plurality of managed server instances are configured to perform a lazy de-serialization of the session data associated with the plurality of replicated sessions at the particular managed server instances of the plurality of managed server instances.

13. A non-transitory computer readable storage medium, including instructions stored thereon which when read and executed by one or more computers cause the one or more computers to perform a method comprising:
providing a plurality of managed server instances that operate within an application server environment as part of a domain that includes a plurality of partitions, wherein each partition, of the plurality of partitions, provides a subdivision of the domain; and
updating, using a patching process, the plurality of managed server instances while providing support for session handling and incompatibility, including, during rollout of a patch to the plurality of managed server instances,
loading session data associated with a plurality of replicated sessions at particular managed server instances of the plurality of managed server instances,
receiving a request associated with a particular session,
attempting to load the particular session at a first managed server instance of the plurality of managed server instances associated with a first patch version, and
if the first managed server instance of the plurality of managed server instances cannot load the particular session, due to an incompatibility in patch version, then directing the particular session to be loaded at a second managed server instance of the plurality of managed server instances associated with a second patch version.

14. The non-transitory computer readable storage medium of claim 13, wherein directing of requests associated with sessions, at particular managed server instances of the plurality of managed server instances, enables requests associated with particular versions of the application server environment, application, or other component, to be directed to managed server instances handling those particular versions of the application server environment, application, or other component.

15. The non-transitory computer readable storage medium of claim 13, further comprising, if the first managed server instance of the plurality of managed server instances cannot load the particular session, providing a response code to a traffic director indicative of one or more other managed server instances of the plurality of managed server instances that can load the particular session.

16. The non-transitory computer readable storage medium of claim 13, further comprising one or more resource groups, which include groupings of deployable resources for use by a partition within a domain, including that each partition, of the plurality of partitions, includes at least one resource group for use by that partition.

17. The non-transitory computer readable storage medium of claim 13, wherein the patching process is provided within a cloud environment and supports multiple tenants operating within the cloud environment, including that each particular partition, of the plurality of partitions, is associated with a particular tenant of the cloud environment.

18. The non-transitory computer readable storage medium of claim 13, wherein during the patching process, the plurality of managed server instances are configured to perform a lazy de-serialization of the session data associated with the plurality of replicated sessions at the particular managed server instances of the plurality of managed server instances.

* * * * *

UNITED STATES PATENT AND TRADEMARK OFFICE
CERTIFICATE OF CORRECTION

PATENT NO. : 10,853,055 B2  
APPLICATION NO. : 16/398887  
DATED : December 1, 2020  
INVENTOR(S) : Islam et al.

Page 1 of 1

It is certified that error appears in the above-identified patent and that said Letters Patent is hereby corrected as shown below:

On the Title Page

On page 4, Column 1, under Other Publications, Line 36, delete "24"," and insert -- 2.4", --, therefor.

On page 4, Column 2, under Other Publications, Line 57, delete "=for" and insert -- for --, therefor.

In the Specification

In Column 6, Line 67, delete "\${CRM DataUsername}." and insert -- \${CRMDataUsername}. --, therefor.

In Column 37, Line 8, delete "('DomainlRollout'," and insert -- ('Domain1Rollout', --, therefor.

In Column 40, Line 62, delete "session" and insert -- session. --, therefor.

In Column 45, Line 64, delete "node" and insert -- node. --, therefor.

In Column 46, Line 11, delete "symlinks," and insert -- symlinks. --, therefor.

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*